United States Patent [19]
Sheffer

[11] Patent Number: 5,515,419
[45] Date of Patent: *May 7, 1996

[54] TRACKING SYSTEM AND METHOD FOR TRACKING A MOVABLE OBJECT CARRYING A CELLULAR PHONE UNIT, AND INTEGRATED PERSONAL PROTECTION SYSTEM INCORPORATING THE TRACKING SYSTEM

[75] Inventor: Eliezer A. Sheffer, San Diego, Calif.

[73] Assignee: Trackmobile, San Diego, Calif.

[*] Notice: The term of this patent shall not extend beyond the expiration date of Pat. No. 5,218,367.

[21] Appl. No.: 284,177

[22] Filed: Aug. 2, 1994

Related U.S. Application Data

[63] Continuation-in-part of Ser. No. 74,034, Jun. 7, 1993, abandoned, which is a continuation-in-part of Ser. No. 891,805, Jun. 1, 1992, Pat. No. 5,218,367.

[51] Int. Cl.[6] .............................. H04Q 7/20; H04Q 7/22; G01S 3/02
[52] U.S. Cl. .............................. 379/58; 379/59; 342/450; 340/539
[58] Field of Search .............................. 379/37, 38, 39, 379/40, 41, 42, 43, 44, 47, 48, 49, 50, 51, 58, 59, 63; 340/539, 990, 988, 995, 426; 342/457, 389, 463, 450; 455/33.1

[56] References Cited

U.S. PATENT DOCUMENTS

| | | | |
|---|---|---|---|
| 4,577,182 | 3/1986 | Millsap et al. | 340/539 |
| 4,688,244 | 8/1987 | Hannon et al. | 379/58 |
| 4,825,457 | 4/1989 | Lebowitz | 379/40 |
| 4,833,477 | 5/1989 | Tendler | 342/389 |
| 4,891,650 | 1/1990 | Sheffer | 342/457 |
| 4,905,271 | 2/1990 | Namekawa | 379/58 |
| 4,993,059 | 2/1991 | Smith et al. | 379/39 |
| 5,055,851 | 10/1991 | Sheffer | 342/457 |
| 5,134,644 | 7/1992 | Garton et al. | 379/39 |
| 5,218,367 | 6/1993 | Sheffer | 342/457 |
| 5,257,397 | 10/1993 | Barzegar et al. | 455/33.1 |
| 5,287,398 | 2/1994 | Briault | 379/38 |
| 5,329,576 | 7/1994 | Handforth | 379/59 |
| 5,334,974 | 8/1994 | Simms et al. | 340/990 |

FOREIGN PATENT DOCUMENTS

| | | |
|---|---|---|
| 0417944 | 8/1990 | European Pat. Off. . |
| 2194119 | 2/1988 | United Kingdom . |

OTHER PUBLICATIONS

"Stolen Cars Phone Home", *Machine Design*, vol. 62, No. 18, Sep. 6, 1990.

*Primary Examiner*—Curtis Kuntz
*Assistant Examiner*—Michael B. Chernoff

[57] ABSTRACT

A tracking system for tracking a portable or mobile phone unit utilizes an array of fixed wireless signal transceivers forming part of a wireless telephone system. The phone unit includes a processor for generating an emergency signal on detection of an emergency condition and transmitting the emergency signal to a remote monitoring station via the wireless telephone network. The emergency signal includes identifying information for identifying the phone unit, as well as identifying or control channel signals received by the phone unit from adjacent wireless signal transceivers which are retransmitted as part of the emergency signal to be used at the remote monitoring station to compute an approximate location of the phone unit.

26 Claims, 14 Drawing Sheets

5,515,419

TRACKING SYSTEM AND METHOD FOR TRACKING A MOVABLE OBJECT CARRYING A CELLULAR PHONE UNIT, AND INTEGRATED PERSONAL PROTECTION SYSTEM INCORPORATING THE TRACKING SYSTEM

CROSS-REFERENCES TO RELATED APPLICATIONS

This application is a Continuation-In-Part of Application Ser. No. 08/074,034 filed Jun. 7, 1993 now abandoned, which was a Continuation-In-Part of Application Ser. No. 07/891,805, filed Jun. 1, 1992, now U.S. Pat. No. 5,218,367.

BACKGROUND OF THE INVENTION

The present invention relates generally to a location system for locating mobile objects such as people on foot, cyclists, vehicles and the like in an emergency.

In U.S. Pat. Nos. 4,891,650 and 5,055,851 of Sheffer a vehicle locating system was described which relied on the use of the existing nationwide cellular radio network used in mobile telecommunications (cellular phone system). Cellular telephone networks rely on a fixed array of cell sites, each cell site covering a predetermined area and having a wireless signal detecting and generating unit at a central location in the area. These cell sites receive and transmit signals to and from cellular phones within their area on their own set of frequencies, and are linked via conventional land lines to a mobile telecommunication switching office (MTSO) for transmission to other cell sites, receivers, or conventional phones via a telephone company central office (CO).

U.S. Pat. Nos. 4,891,650 and 5,055,851 describe a system for detecting an emergency in a vehicle, such as forced entry, and using the existing cellular radio network to transmit an alarm signal from the vehicle to adjacent cell sites. The mobile telephone switching or MTSO is modified in order to transmit a signal indicating the signal strength of the received alarm signal to an external, to telephone company, central alarm station. The transmitted signal also includes vehicle identifying information. At the central alarm station, the approximate vehicle position can be estimated based on the relative strengths of the signal received from the vehicle at adjacent cell sites. A police car can then be dispatched towards the approximate vehicle location. The tracking vehicle turns on its own cellular car radio so that the tracking vehicle is itself tracked using the same technique. In this way, an operator in the central alarm monitoring station can observe the relative position of the original vehicle and the tracking vehicle or vehicles. Since the exact position of the tracking vehicle is known, this can be used to provide the tracking vehicle with instructions for moving towards the target.

One disadvantage of this previous vehicle location system is that it requires modification of the software at the MTSO so that it will generate the required signal strength signals for transmission to the central monitoring station. This would be a relatively complex and expensive procedure.

In my U.S. Pat. No. 5,218,367, a vehicle tracking system is described in which signal processing units comprising modified cellular transceivers are installed in vehicles and are connected to one or more vehicle break-in sensors. The vehicle unit initiates an emergency transmission to a remote monitoring station in the event of an emergency, and also monitors signal transmissions from adjacent cell sites and transmits cell site identifying information in the emergency transmission.

SUMMARY OF THE INVENTION

It is an object of the present invention to provide a new and improved system for locating movable objects in emergency systems, such as vehicles, cyclists, and pedestrians.

According to the present invention, a tracking system for tracking a movable object is provided, which comprises an array of fixed wireless signal receiving and transmitting units each covering a predetermined area and forming part of a wireless telephone network, each fixed wireless unit including means for transmitting wireless voice and control channel signals identifying the unit, and a movable signal processing unit, the unit including a signal generator or modified cellular transceiver for generating an emergency signal on detection of an emergency condition, the signal generator continuously scanning all voice and control channel signals from any of the fixed wireless signal receiving and transmitting units within range of the signal processing unit during an emergency condition and storing any received wireless unit identifying signals, and a transmitter for transmitting the emergency signal via the array of signal receiving and transmitting units, each emergency signal including identifying information for identifying the signal processing unit and received wireless unit identifying signals. A central monitoring station is provided for receiving the emergency signals and computing an approximate location of the signal processing unit from the received wireless unit identifying signals.

In one embodiment of the invention, the signal processing unit comprises a portable phone for carrying by a person, the portable phone including a panic button for pressing by the person to generate the emergency signal. A microprocessor in the portable phone is programmed to selectively operate the unit for standard two-way portable phone communications when no emergency situation exists, and to transmit the emergency signal on detection of an emergency condition. In this case, the portable phone also acts as a personal protection device for alerting authorities if the person is threatened or attacked. All they have to do is press the panic button, and the emergency signal will be automatically generated and transmitted to the central monitoring station for location determination and information on the person under threat without the knowledge of the attacker.

In another embodiment of the invention, the signal processing unit is a modified wireless or cellular telephone unit for installation in a vehicle, for detecting break-ins. A person turns the protection system "ON", when he parks his vehicle, by depressing a miniaturized transmitter. By the same token, he must depress it again, when he enters the vehicle and before he turns the car ignition key. If he is not disarming the protection system, a silent alarm will be transmitted to the monitoring station. The same panic button will be provided for actuation by a person in the vehicle in the event of an attempted car-jacking, or other emergencies. The unit includes a transceiver and a phone handset. The phone handset may be a portable, battery operated telephone which can be plugged into a suitable receptacle on the transceiver while the user is in the vehicle. In this case, the portable phone alone will be adapted to transmit an emergency signal when carried by a person away from their vehicle, as described above.

The computation of the approximate location of a person on foot or a vehicle when the unit transmits the emergency signal may be performed in a number of possible ways. The system may use the existing cellular telephone network which has a fixed array of cell sites, each site having a radius of radio coverage of around 3 to 5 miles. Each site will have its own identifying code for allowing cellular phone communications. If signals are received from at least three different cell sites by the processing unit, this will provide sufficient information for an approximate vehicle location to be determined. In this case, the computation may be performed by using cell sector information. Each cell site is divided into sectors, and sector information is transmitted along with other cell identifying information. Based on information on the overlapping antenna pattern information, an approximate object location can be calculated.

Additionally or alternatively, approximate object location may be calculated using signal strength information. The strength of the signals received from each adjacent cell site will be dependent on the distance of the object from that site. The unit may be programmed to monitor the signal strength of the signal received from each adjacent cell site, and to retransmit the signal strength information along with the rest of the emergency signal. A computer at the central monitoring station then computes an approximate object location based on the signal strength information.

Alternatively, the system may use a wireless communication system having a much denser array of cells or wireless signal transmitters. The cell radius in such a system may have a radius of 100 meters to ¼ mile, and cells will be located inside buildings such as shopping malls, unlike the existing cellular telephone network. In this case, the approximate position of the object can be computed based on the control channel and other codes information received from the closest cell.

In a wireless communication system having a very large number of cell sites, some cells will reuse control channels. This is typically true in large cities, and will probably also be true in the expanded, dense communication system now proposed which has a much smaller radius for each cell. Thus, in systems where the same control channel is assigned to more than one cell site, the detected control channel will be the same for two or more different sites, so the position of the object cannot be determined based only on the received control channel information. An ambiguity resolution process is preferably provided in the system for cell identification in cases where more than one cell in the region of interest has the same control channel. This uses information on adjacent cell sites to resolve the ambiguity. Normally, a processing unit at any position will receive signals from at least two adjacent cell sites. This allows a determination to be made based on stored information regarding adjacent cells.

Once an approximate location has been computed based on some or all of the above procedures, vehicles can be dispatched to the location. These may be equipped with direction finder equipment in order to home in on the signal transmitted by the portable phone.

This system allows persons to summon assistance at all times, even when they are away from their home or vehicle. All that the person needs to carry is a simple, compact portable phone unit which is of the same general dimensions as a conventional portable phone but which incorporates the hardware and software necessary to generate and transmit the necessary emergency signal should the person push the panic button. Preferably, the portable phone has a built-in modem linked to the processing unit for transmitting the emergency signal directly to a computer at the central monitoring station via a receiving modem linked to that computer. This allows the emergency signal to be directly input to a computer at the monitoring station, where the approximate location can be computed quickly and easily. Rescue personnel can therefore be dispatched to the person's approximate location relatively quickly, within a short time after the person pushes the panic button. The system will be relatively inexpensive to set up and run, since it uses an existing wireless telephone network or personal communication system. The existing network of cell sites does not have to be modified in any way, but is simply used to provide location information and also to receive and transmit emergency signals in the same way as conventional communication signals.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
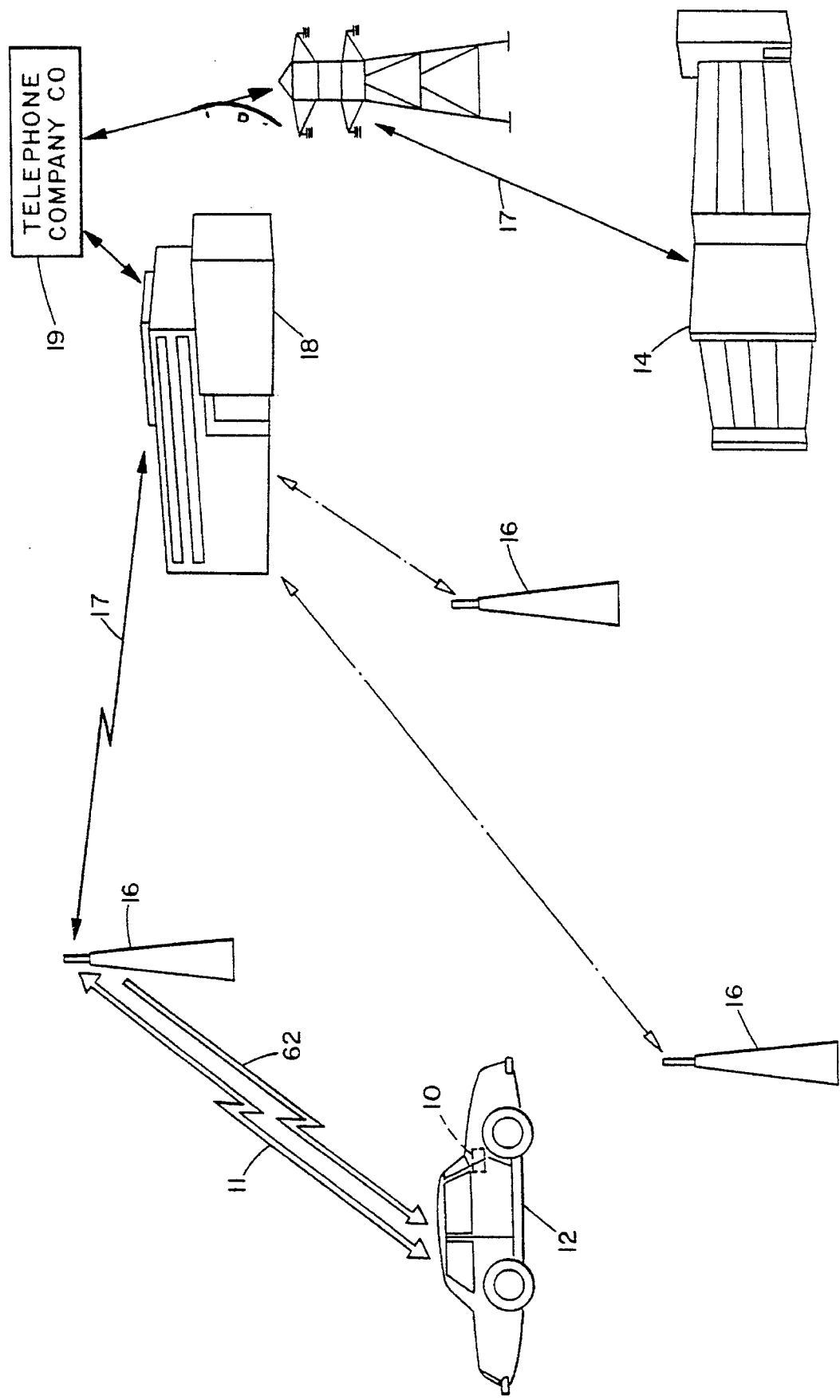
FIG. 1 is a schematic block diagram of a vehicle tracking system according to a preferred embodiment of the present invention.

A tracking system according to a first embodiment of the present invention is schematically illustrated in FIG. 1. The system basically comprises a cellular signal processing unit 10 mounted in a vehicle 12 and a central processing or monitoring station 14 for receiving alarm signals emitted from the processing unit 10 and computing an approximate vehicle position from those signals. The system makes use of the existing nationwide cellular telephone system consisting of a plurality of radio transmitters or cell sites 16 each covering a predetermined cell area. The cell sites 16 covering a predetermined region are linked to the MTSO 18 and to the telephone company central office or CO 19, as will be understood by those skilled in the field. Alarm signals 11 emitted from unit 10 are transmitted to the closest adjacent cell site 16 and relayed from there over conventional telephone lines or microwave link 17 through the MTSO station 18, CO 19 and to the central processing station or control center 14, as will be explained in more detail below.

Figure 2:
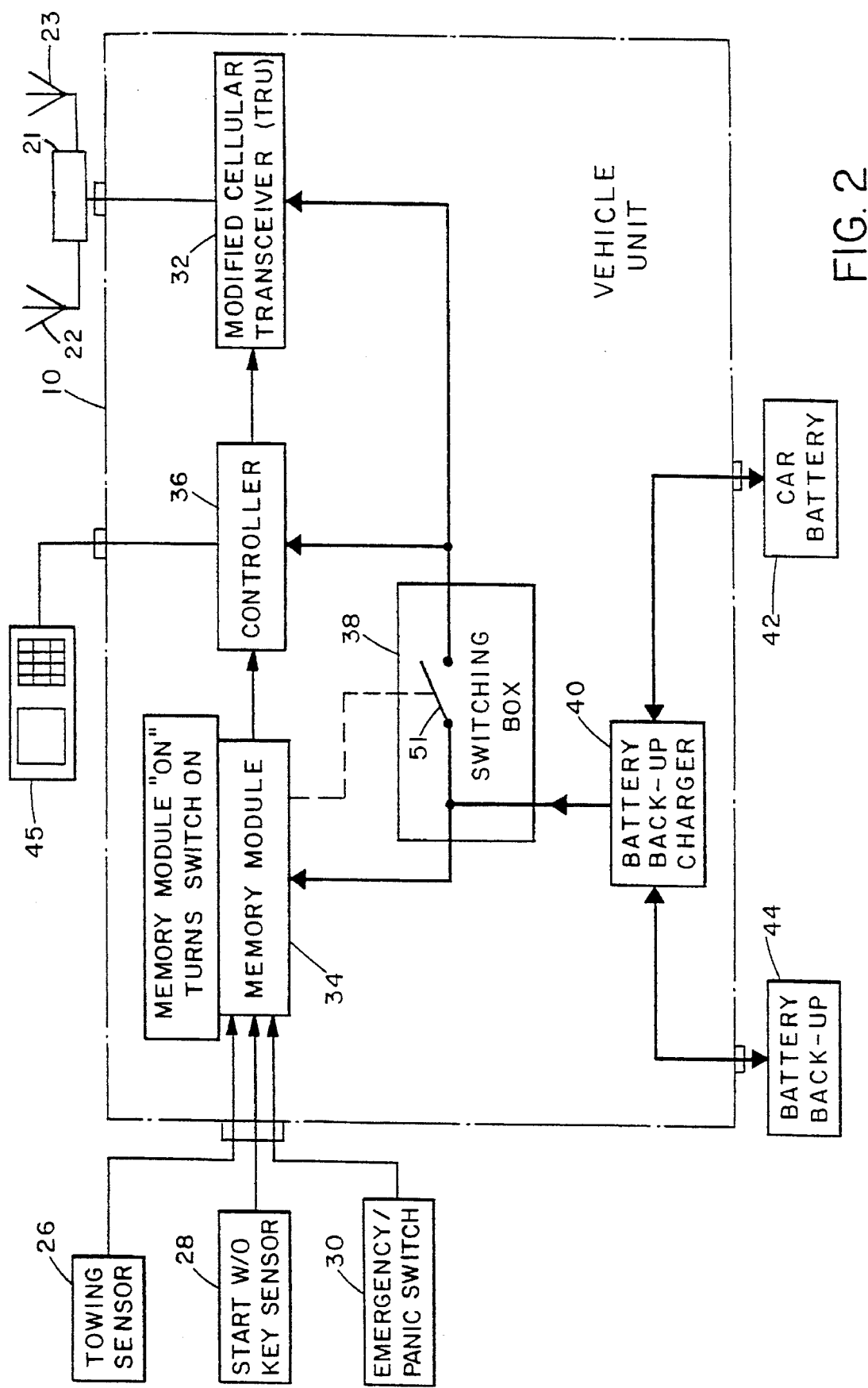
FIG. 2 is a block diagram of a cellular processing unit for installation in a vehicle.
Figure 3:
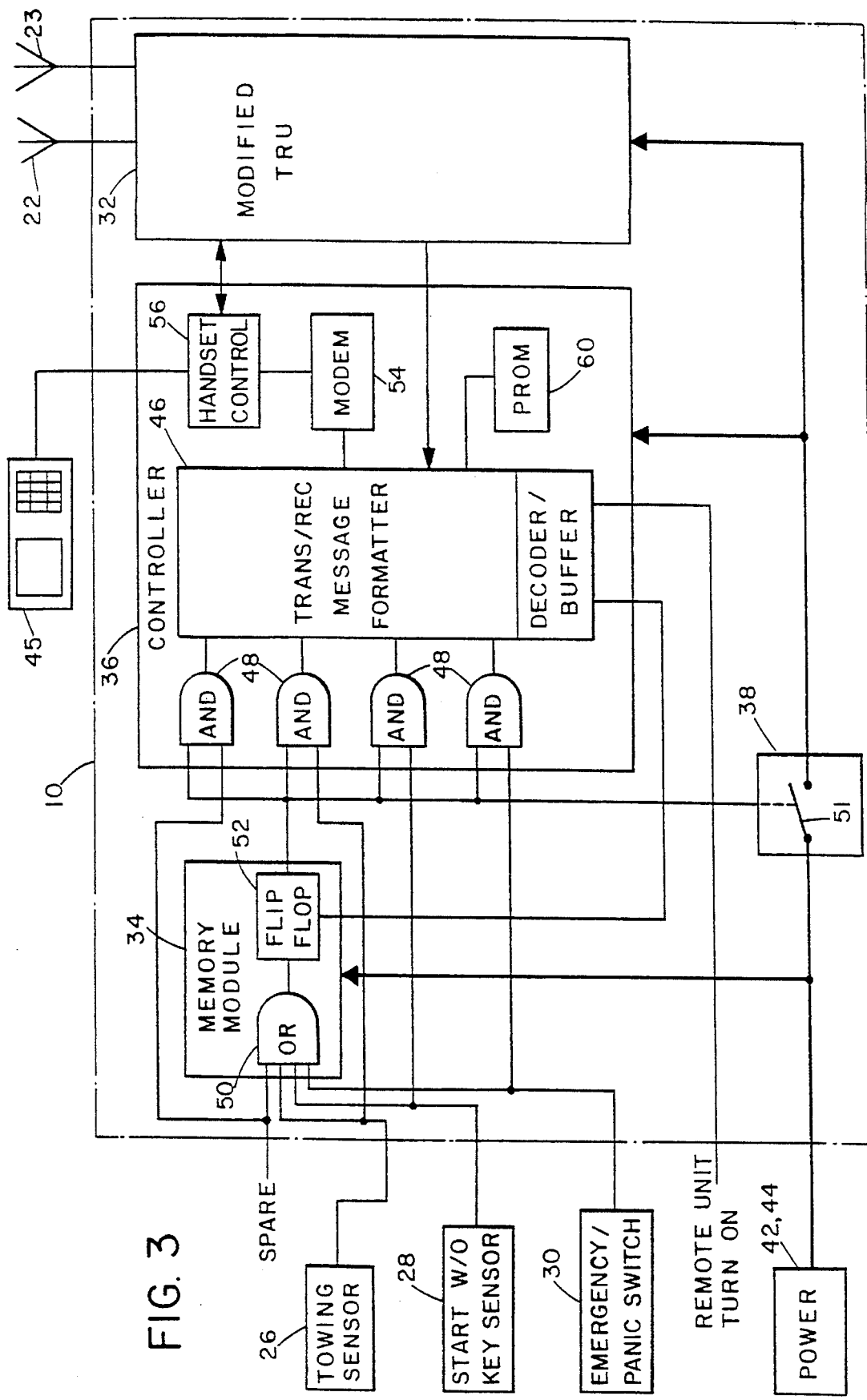
FIG. 3 is a more detailed circuit diagram of the unit of FIG. 2.

The signal processing apparatus 10 for mounting in a vehicle is illustrated in more detail in FIGS. 2 and 3. The apparatus includes a modified cellular or transceiver phone-type unit 32 which is illustrated schematically in FIG. 2 and in more detail in FIG. 3. Unit 32 includes modified cellular phone circuitry as well as built-in alarm signal generating circuitry and software for generating an alarm signal in the event of an emergency. The antenna is connected to a "switching" module 21, normally tying the non-hidden antenna to the processing unit 10. However, as soon as the non-hidden antenna is compromised, the "switching" module will, automatically, connect the hidden antenna to unit 10. A series of alarm sensors 26,28,30 of various types are provided. For example, a sensor 28 may be provided to detect starting of the ignition without a key, while another sensor 26 may be arranged to detect towing. An emergency/panic switch 30 for actuation by the vehicle driver may also be provided as one of the alarm sensors. This may be provided as a push button on the cellular phone handset 45. Any conventional type of car break-in detector or sensor as used for actuating typical car alarms may be used in this system. A transmitter may be provided for allowing the vehicle owner to remotely arm and disarm the system. The modified cellular phone unit is similar to a standard cellular phone unit and has all the necessary hardware and software for cellular phone communication purposes. However, the hardware and software is modified to enable the unit to additionally operate as an alarm unit in an emergency situation.

The vehicle unit includes the modified cellular transceiver 32 which is linked to the antenna 22 for receiving incoming radio signals from the antenna and transmitting alarm as well as standard cellular telephone signals via the antennas. The various sensors are linked to a memory unit 34 which is connected to central controller 36. The unit is connected via switch unit 38 and battery back-up charger 40 to both the car battery 42 and a back-up battery 44. Conventional cellular phone handset 45 is connected to the controller. Unit 10 is small enough to be mounted in a concealed location in a vehicle for added security.

The controller provides an interface between the alarm sensors and the transceiver, and is illustrated in more detail in FIG. 3. As illustrated in FIG. 3, the controller includes a transmit/receive message formatter 46 which has a series of inputs from AND gates 48. Each AND gate has one input connected directly to the output of a respective one of the sensors, and another input connected to the output of memory unit 34. The memory unit 34 comprises an OR gate 50 having inputs connected to all of the sensor outputs and output connected to the AND gates via "D" flip flop 52. The controller is connected via modem 54 and handset control 56 to cellular phone handset 45, which may be of a conventional type. Some conventional cellular phone handsets have a "hands free" option which enables a driver to use the phone without holding the handset. This option consists of a built-in microphone and speaker. A handset having this option may be used, or an extra speaker/microphone may be built in to the vehicle, for example beneath the dashboard.

A PROM memory unit 60 linked to controller contains alarm information to be used in the event of an emergency, including a vehicle I.D. number, primary and secondary emergency phone numbers to be contacted in the event of an emergency, and other unit parameters.

When no alarm or emergency condition exists, the unit 10 can be operated conventionally as a cellular phone. The controller and modified cellular transceiver are similar to those used in conventional cellular phone units but are modified in order to respond to emergency indications from any of the sensors to generate and transmit an alarm signal to a predetermined telephone number to which the computer at the monitoring station is connected. The controller provides an exclusive OR condition between the cellular handset and the alarm signal transmission feature. Only one of these options can be used at a time. Thus, when an emergency situation is detected, the cellular handset enters a state where it is deactivated while the alarm signal is transmitted, to ensure that alarm transmission will continue even if the perpetrator chooses to disable the handset by removing it. A hidden microphone/speaker can be used to provide two-way voice communication. The voice channel is shared between the on-going alarm data transmission and the voice signal. (In case of emergency/panic the driver could stay in voice contact with monitoring alarm station, even though the alarm data is continuously transmitted.) Once the alarm status is concluded, memory module 34 is deactivated and the cellular handset can be used for voice signal transmission only.

In a conventional cellular telephone network, all cell sites continuously transmit identifying signals 62 (see FIG. 1) containing information on the cell I.D., the control channel frequency, and the voice channel frequency and signal strength measurements of cell sites as sensed by a vehicle cellular phone. These signals can be picked up by mobile cellular phone units in the vicinity, so that a currently "active" cell is used for transmitting signals to and from the vehicle. In the modified cellular unit 10 of this invention, the transceiver is programmed to scan all control channels of the adjacent cellular sites for their signal transmissions to obtain frequency channel identification, sectoring information, and signal strength, whenever an emergency sensor is activated.

In the event that one of the sensors is activated, the controller determines which sensor the signal is received from, and obtains an alarm code corresponding to this sensor from memory 60. At the same time, the in-built modem 54 automatically goes "Off-Hook" and the transceiver commences scanning all adjacent cellular sites, for their signal strength readings, selecting the highest value readings. At this time, the controller initiates a dialing sequence to the appropriate telephone number, per the numbers stored in memory 60, to link up with the computer at the central monitoring station. In conjunction with the controller, the transceiver transmits an alarm message or packet of information to the central computer. This packet is continuously updated and transmitted at periodic intervals to the telephone number as long as the alarm condition exists. The telephone number dialed automatically corresponds to the computer installed at the central monitoring station. The packet of information will include the type of alarm code, the vehicle i.d., other vehicle identifying information, and the frequency channel information, sectoring information, and signal strength information received from all the adjacent cell sites. The data communications between the vehicle unit and the computer at the monitoring station use conventional modem to modem communication with a reliable communication protocol.

The vehicle unit 10 is powered by the car battery 42 with the back-up battery 44 providing fall-back power should the car battery be out of commission. The memory circuit 34 is the only part of the unit which is continuously powered up, even when the car ignition is off, as indicated in FIG. 2. This circuit continuously monitors the sensors for an alarm output, and triggers the switching box and consequently the rest of the circuit to become operational in the event of an alarm detection. Since this part of the unit will draw power even when the car is stationary and the car battery 42 is not being recharged, it must draw extremely low current. As illustrated in FIG. 3, when any of the sensors is actuated, the output of OR gate 50 will be positive, operating the flip-flop device to close the switch 51 in unit 38 and connect the remainder of the circuit to the power supply. Additionally, switching box 38 will be on whenever the ignition is on and the cellular phone is on.

The central monitoring station will now be described in more detail with reference to FIGS. 4–8. This station may be a fixed site or a mobile unit, or both fixed and mobile monitoring stations may be provided. The station includes a computer 70 connected via modem 72 to the telephone line 73. The computer 70 has a memory 74 which includes stored information on customers and vehicle i.d. numbers, as well as cell site information including cell frequency and sectoring information and respective metro areas digital maps, or any other maps replicating the true nature of roads, landmarks and other significant items. The computer is linked to a suitable output video monitor 76, which preferably includes a standard display as well as a digital map display, and has operator input via keypad unit 77. The computer is suitably programmed to respond to incoming alarm signals and accompanying information packets by computing an approximate vehicle position, as will be explained in more detail below with reference to FIGS. 6–8.

Additionally, in a preferred embodiment of the invention, the computer operator is able to listen to the sounds inside the vehicle once the alarm has been activated, and may also talk to the vehicle occupants, if desired by activating a function key on their computer keyboard, via the speaker/microphone installed in the cellular phone handset or elsewhere in the vehicle which is automatically activated on detection of an alarm condition and receipt of a command signal from the monitoring station. As noted above, the cellular handset is deactivated while the alarm information is being transmitted. This feature is particularly useful where the driver of the vehicle has activated a manually operated panic button on the cellular phone handset or on front panel of the vehicle, for example. The operator can determine what type of emergency has occurred and can dispatch the appropriate emergency response vehicle.

Figure 5:
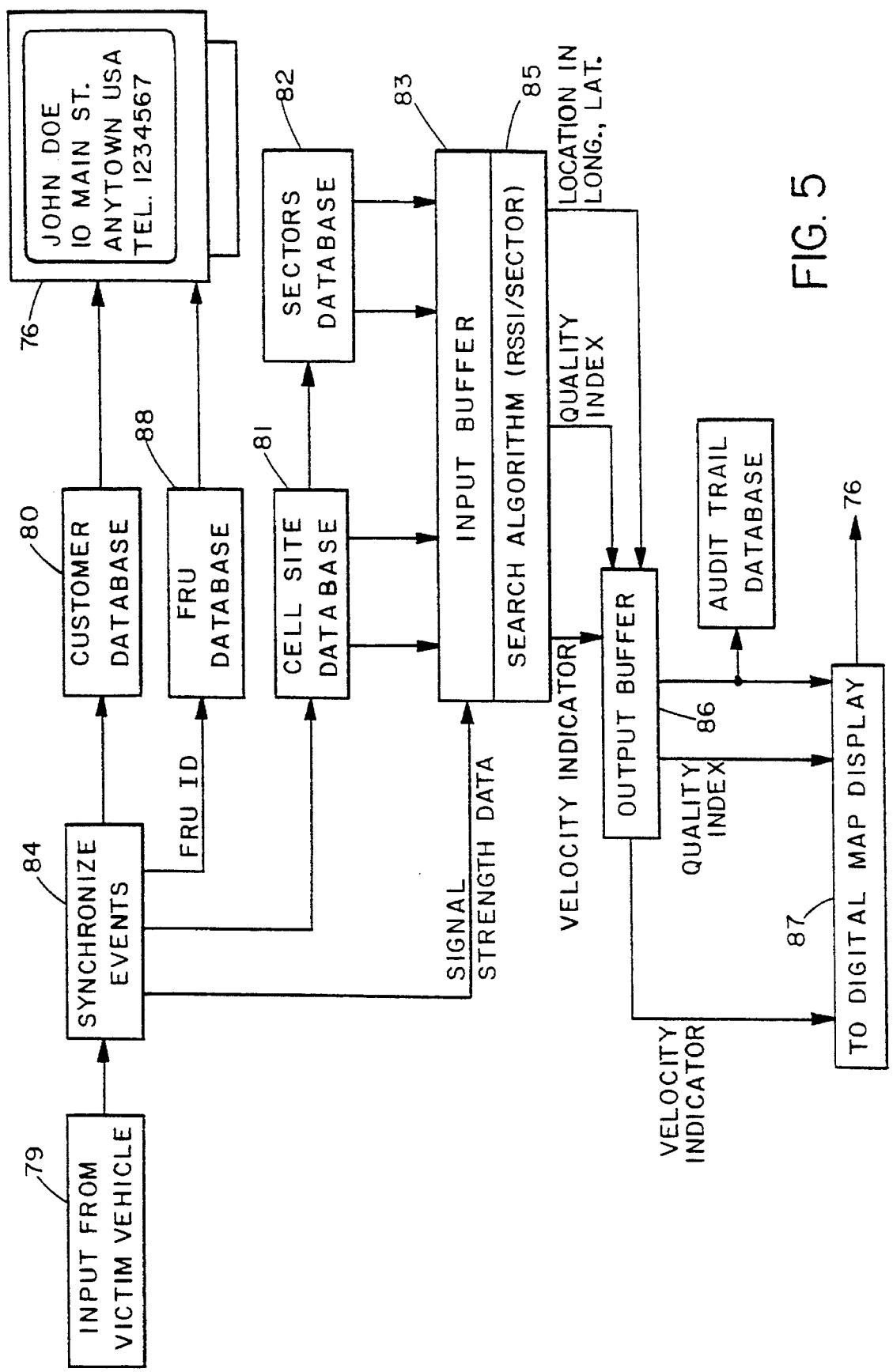
FIG. 5 is a schematic block diagram of the configuration and information flow in the central monitoring station computer.

FIG. 5 illustrates the schematic configuration and information flow in computer 70 on receipt of an incoming information packet 79 from a vehicle unit in which an emergency situation has occurred and been detected. All incoming alarm signals are first displayed on the monitor 76 and stored in a buffer memory area 83 in the computer. The computer includes several databases 80,81,82 containing information on customers, cell site locations, and cell sector information, respectively. When an incoming information packet is received, the information is synchronized (84) and customer database 80 is searched based on the vehicle i.d. The cell site and sector information databases are searched to determine the adjacent cell locations from the incoming cell information. The cell and active cell sector determined from the database are input along with the signal strength levels to a temporary input buffer memory 83, and then the information is processed at 85 in accordance to stored program instructions to determine the vehicle location as a longitude and latitude. The approximate vehicle location is transmitted via output buffer 86 to a digital map display 87 on output screen 76. The computer also includes a field response unit FRU database 88 for storing identifying information on FRU vehicles which are dispatched to the computed vehicle location.

The computer is programmed to display a map of the geographical area corresponding to the detected cell site information, and also displays in a window on the screen a text display of the vehicle i.d. and information on the vehicle owner and vehicle to aid in subsequent mobile unit tracking. This information will include vehicle type and color, vehicle plate number and identification number, and the owner's name and address. This information forms part of the alarm information packet transmitted from the vehicle. The computer is also programmed to compute an approximate vehicle location from the incoming cell site signal strength and identifying information, and this approximate location is displayed on the map as a blinking red spot or circle, for example. The information is continuously updated based on incoming information from the vehicle, and the map is moved to a new area as necessary.

Figure 6:
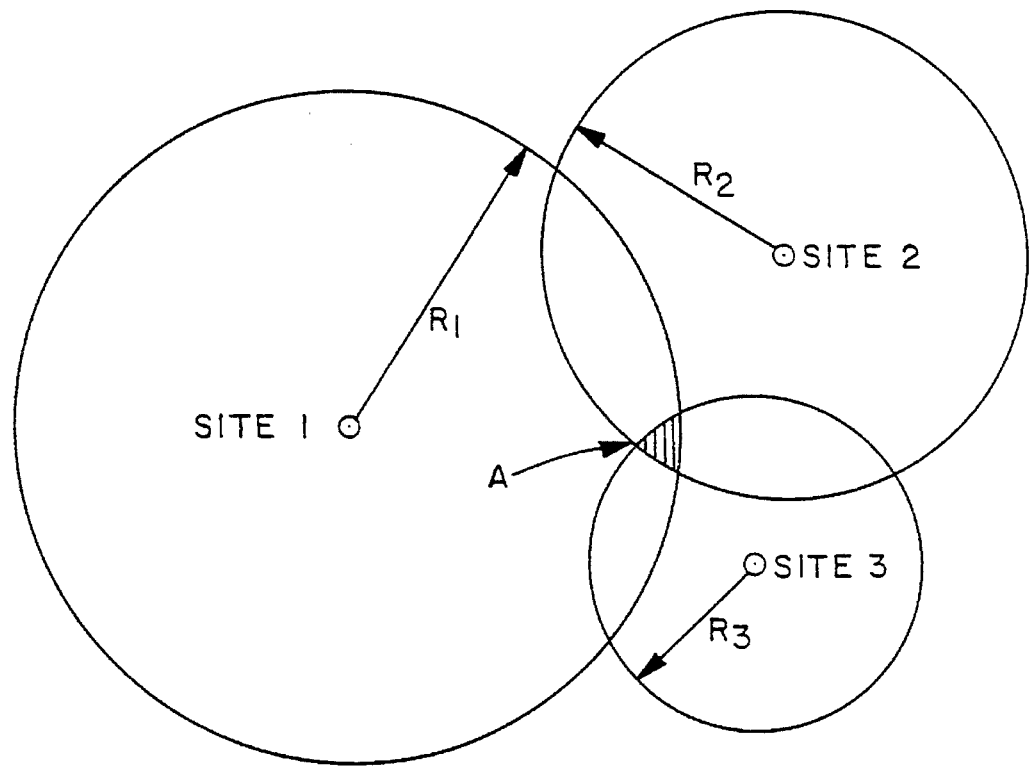
FIG. 6 illustrates a vehicle unit location in the vicinity of three fixed cell sites and graphically illustrates a triangulation process for estimating the vehicle position.
Figure 7:
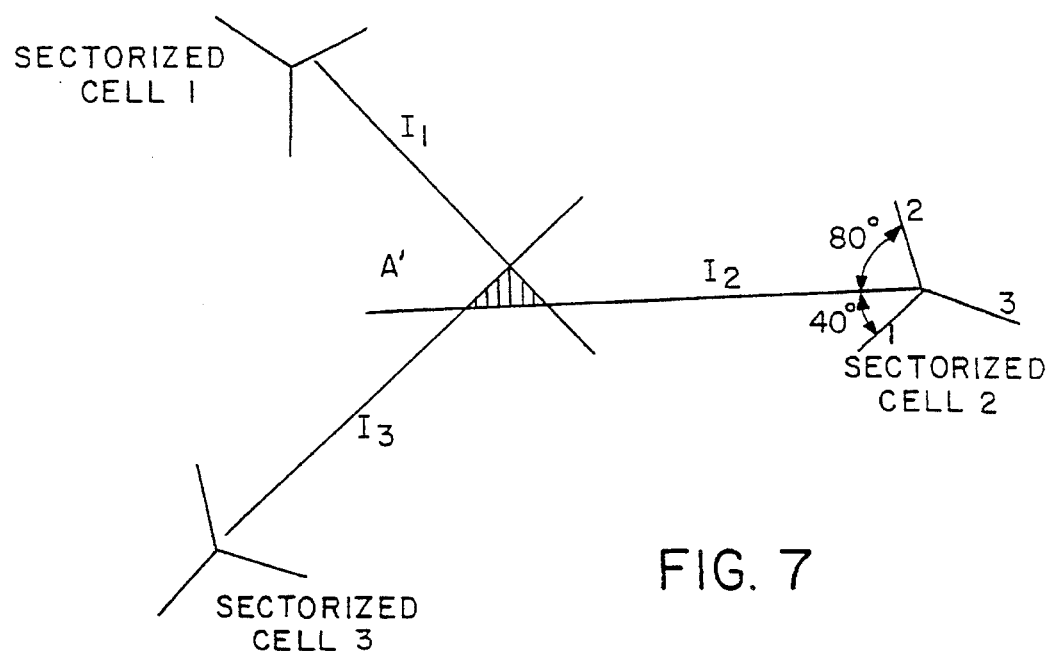
FIG. 7 graphically illustrates a sectoring computation for estimating vehicle position.
Figure 8:
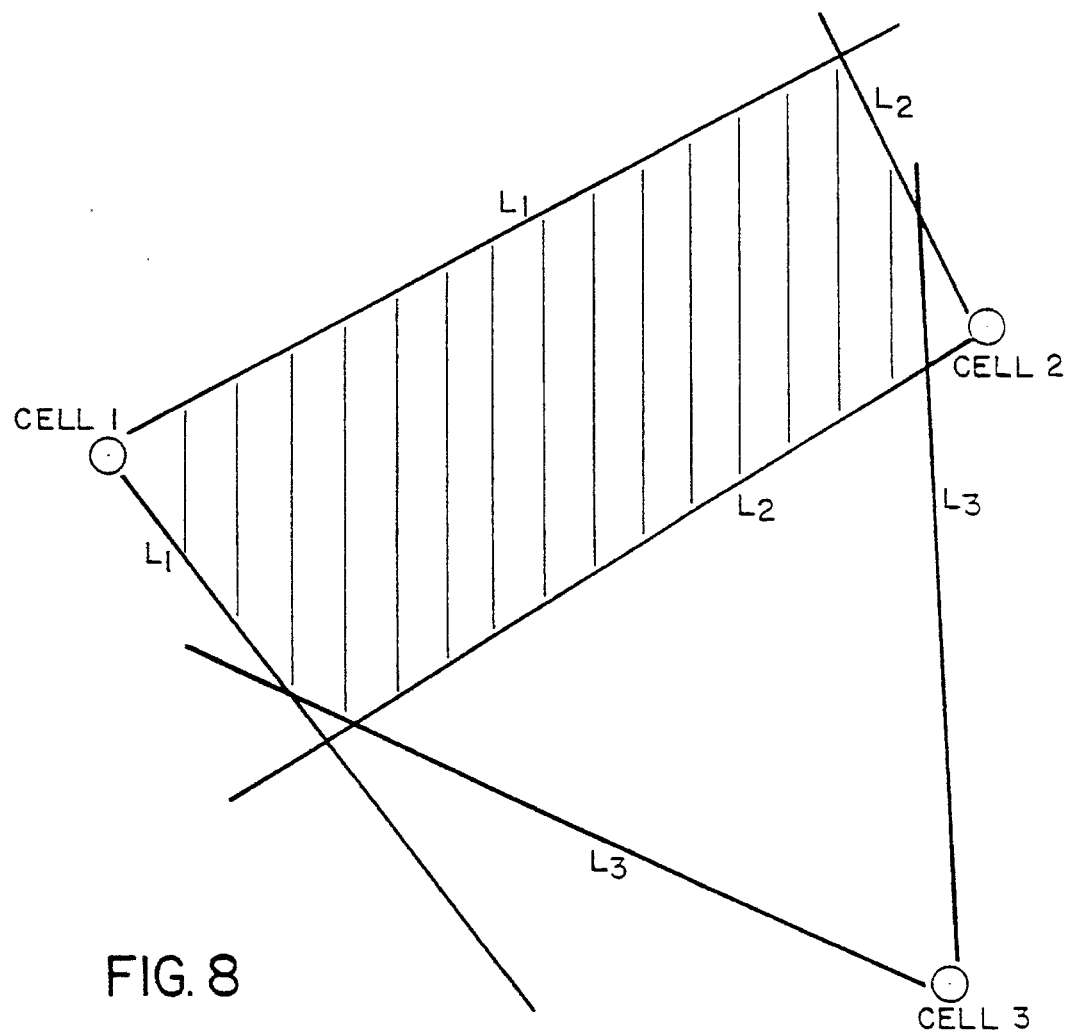
FIG. 8 schematically illustrates cell sector border lines for three adjacent cells.

FIGS. 6–8 illustrate schematically the procedure used by the computer to estimate vehicle position. As illustrated in FIG. 6, the received signal strength indicator SS of respective cell sites 1, 2 and 3 may be used as the basis of a triangulation algorithm to find the approximate location of the vehicle. Due to the nature of the actual propagation contours, which will not normally be a straight line due to ground contour variations, it will be impossible to get an accurate indication of the vehicle position using only this technique. However, it does allow the approximate position of the vehicle to be estimated, enabling emergency vehicles or field response units to be dispatched to the approximated area. The triangulation calculation is based on the fact that the approximate distance of the vehicle from any cell site can be calculated from the signal strength of the signal received by the vehicle from that site. Thus, the vehicle will be in a circle of radius equal to the distance calculated based on the received signal strength. If circles are drawn from three adjacent cell sites, as illustrated in FIG. 6, the vehicle is likely to be in the area A where the circles overlap. The approximate vehicle position is estimated from the following relationship:

$$\frac{SS_1}{SS_2} = \frac{K}{r_1^x} \times \frac{r_2^x}{K} \quad \text{or} \quad \frac{r_2}{r_1} = x\sqrt{\frac{SS_1}{SS_2}}, \tag{1}$$

where $2 \leq x \leq 4$ depending on terrain and other considerations, where r is the circle radius, SS is the signal strength, and K is a constant. Based on this relationship, all r's can be expressed in terms of $r_1$. $r_1$ is first assumed to be small, and is then incremented until all or most r's meet, at which point the calculation is stopped. At this point, A will be at its smallest value. The same technique can be used for any number of cell sites, or r's. Or, r's may be found directly by knowing the K constant.

Since this procedure only provides an approximate vehicle location, the position is further refined using sectoring information, as illustrated in FIG. 7. Each cell site is divided into sectors, as illustrated in FIG. 7, and each sector has an antenna pattern overlapping the antenna patterns of adjacent sectors. Sector frequency and directional information is stored in computer memory 74. The relative signal strengths from different sectors surrounding the victim vehicle can therefore be used to further refine the vehicle position. If signals from two different sectors of a particular cell site are detected, for example, an imaginary line I can be drawn between the two sectors based on the relative signal strengths between those sectors, as illustrated in FIG. 7, based on the following relationship:

$$I = B \times \left(1 - \frac{S1}{S2 + S1}\right) \qquad (2)$$

where I is the direction to the vehicle, B is the "inbetween" angle between the adjacent sectors, S1 is the strong sector signal strength, and S2 is the weak sector signal strength.

For example, considering sectorized cell 2 in FIG. 7, assume that the signals received from sectors 1 and 2 of cell 2 have intensities of 10 and 5, respectively. The vehicle is therefore more aligned with the main lobe of sector 1. If the angle between the sectors is 120°, the imaginary line is drawn at 40° to the dividing line between the sectors.

Imaginary lines are drawn in this way from all of the detected cell sectors, and these lines intersect to form an imaginary area $A^1$. If this corresponds to the area A found by the triangulation algorithm, the search for the approximate vehicle location is concluded. This calculation assumes that the vehicle receives more than one sector signal strength per cell site. If only one sector signal strength is received per cell site, the intersection of this sector beam width with the other sector site borders forms an approximate search area B, as illustrated in FIG. 8, where lines L are the sector information border lines. Where no sectorized cell information is available, the initial position calculated by triangulation is used.

Figure 9:
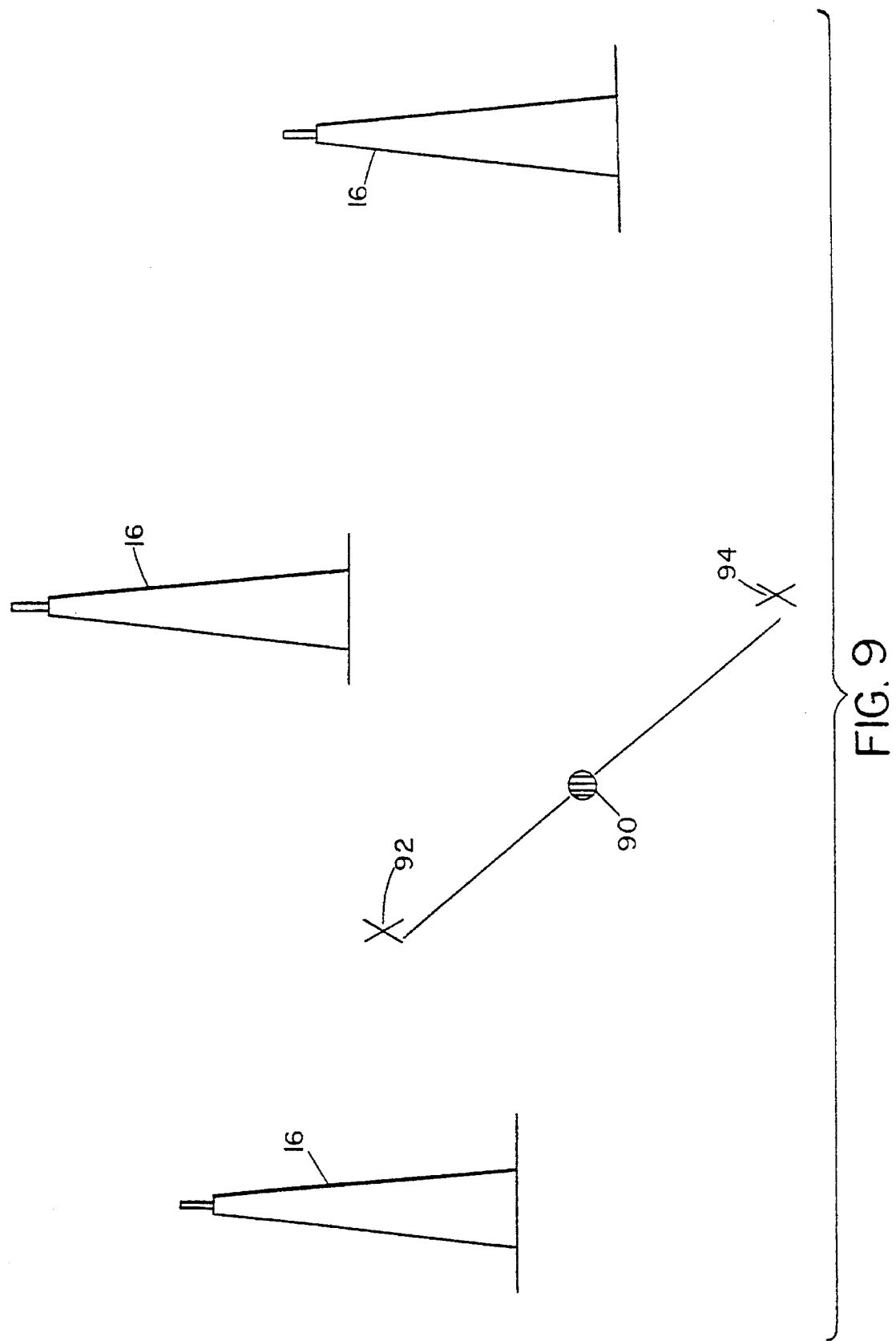
FIG. 9 is a schematic illustration of a final stage in the tracking process.

Once the approximate vehicle position has been computed and displayed on the screen, an operator or dispatcher at the central monitoring station dispatches one or more emergency vehicles or FRUs towards the estimated location. Each of the FRU vehicles will have a cellular signal processing unit identical to that in the vehicle being tracked. In FIG. 9, the estimated vehicle location computed at the monitoring station is at 90, while 92 is the actual vehicle location. When a dispatched vehicle or FRU reaches the approximate location 90, the processing unit in the FRU will transmit an information package to the central computer in an identical manner, from which the position of the chasing vehicle can be estimated and displayed at 94 on the screen as a different color dot. At the same time, the driver of the dispatched vehicle or FRU contacts the operator by cellular phone and gives them the actual position, which the operator enters on the screen at 90 for comparison with the computed position. The distance discrepancy between the FRU vehicle actual and computed positions 90 and 94 is used to adjust the victim vehicle position, as illustrated in FIG. 9, to a corrected position 92 based on the discrepancy between the calculated and actual positions of the dispatched or reference vehicle. The corrected victim vehicle position is then displayed and the chasing vehicle is directed to the corrected position. This correction process continues throughout the chase until the vehicle is actually located. Alternatively, or in addition to the above, the FRU vehicle can be equipped with conventional direction finding equipment. When the FRU is dispatched to point 90 in FIG. 9 it will turn on its direction finder to locate the stolen vehicle at 92. The direction finder indicates relative signal strength and direction at a resolution of +5°. A tracking can be terminated with an appropriate command entered on the cellular handset in the vehicle itself, or entered in the computer at the remote monitoring station.

This system provides considerable security against theft and other emergency situations and can be easily and inexpensively installed in any vehicle, making use of the existing cellular telephone network. The processing unit installed in the vehicle is capable of receiving incoming signals from existing cellular phone system transmitter sites surrounding the vehicle, decoding the signals, and transmitting the decoded signals along with the alarm information to a monitoring computer at a remote site where an approximate vehicle location can be computed from the received signals from adjacent cellular transmitter sites. This requires absolutely no modification to the existing cellular telephone network, and so it is inexpensive and convenient to install.

The vehicle unit is set up to make disabling or tampering difficult. Removal of the car battery or cellular phone handset does not disrupt alarm information transmission to the monitoring station. Two separate cellular antennas, one hidden, one not are used, so that removal of one antenna will also not disrupt the tracking system. The vehicle unit is set up to draw only low current when the vehicle ignition is off and the car battery is not being recharged.

Although in the above embodiment the system is described for tracking a modified cellular phone unit in a vehicle, it will be understood that the same basic system, without the break-in sensors, may be used to track any movable object, such as a person on foot or on a bicycle. Also, although both sectoring information and signal strength information are used in the above embodiment to locate the object, an approximate position may alternatively be obtained using only sectoring information or only signal strength information. If at least two cell sites are received, the victim may be anywhere within the area of intersection of the respective cell sectors. Thus, referring to FIG. 8 above, the victim will be within the shaded area if the indicated three cell sectors are received. This may be sufficient to locate the victim if search vehicles equipped with direction finder equipment are dispatched to the intersection area.

Although in the embodiment described above, both sectoring and signal strength information is transmitted to a remote, central monitoring station and processed there to derive an approximate location, it should be understood that processing of the sectoring and/or signal strength information could also be carried out at the MTSO or mobile telephone switching office. This would require modification of the switching software at the MTSO to perform the necessary computations.

Additionally, with the advent of cellular or other wireless communication systems having a larger number of transmitter/receiver sites covering a much smaller area, location may be determined with sufficient precision using only the cell site identifier.

Figure 10:
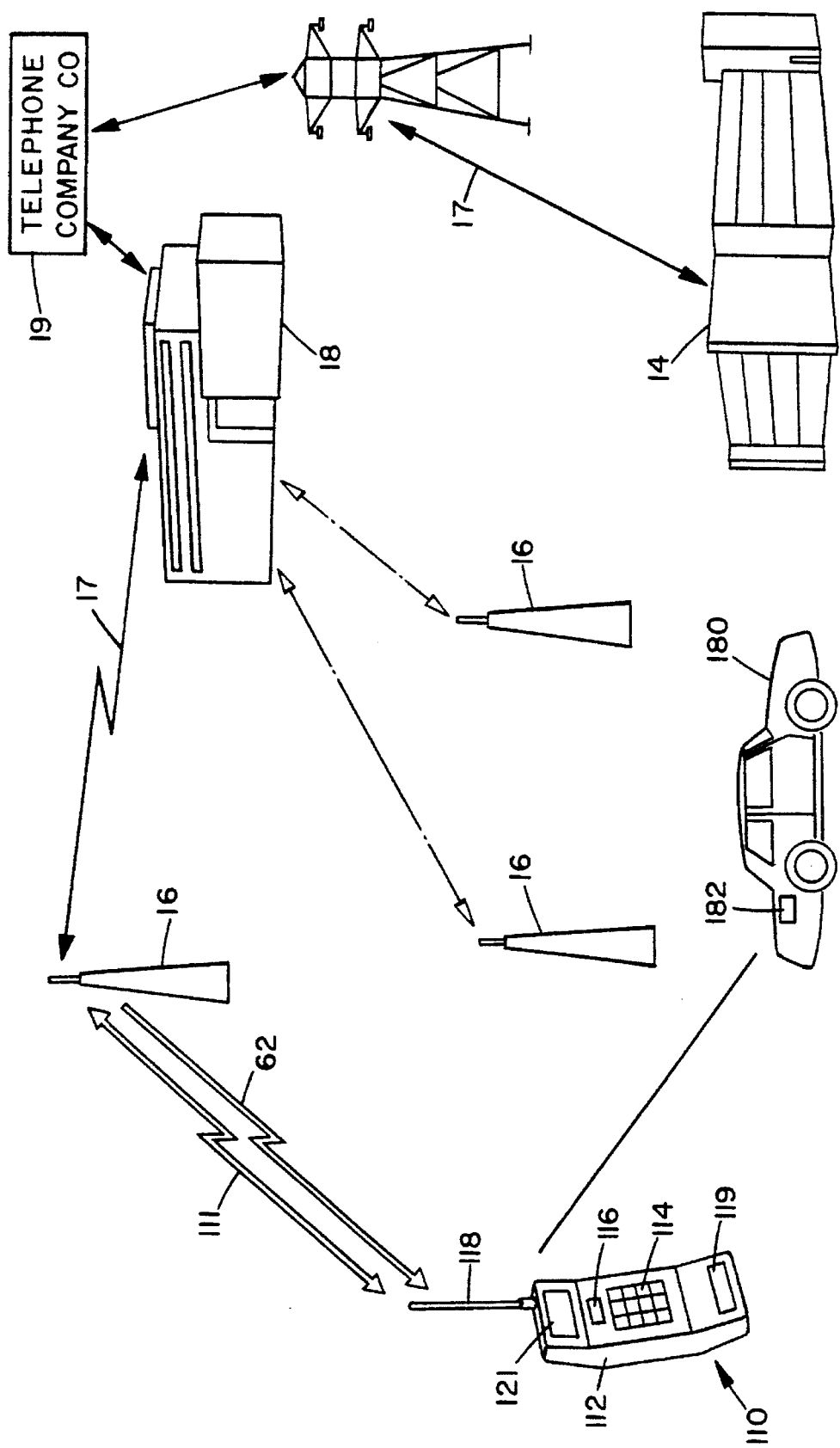
FIG. 10 is a schematic block diagram of an object tracking system according to a second embodiment of the present invention.
Figure 11:
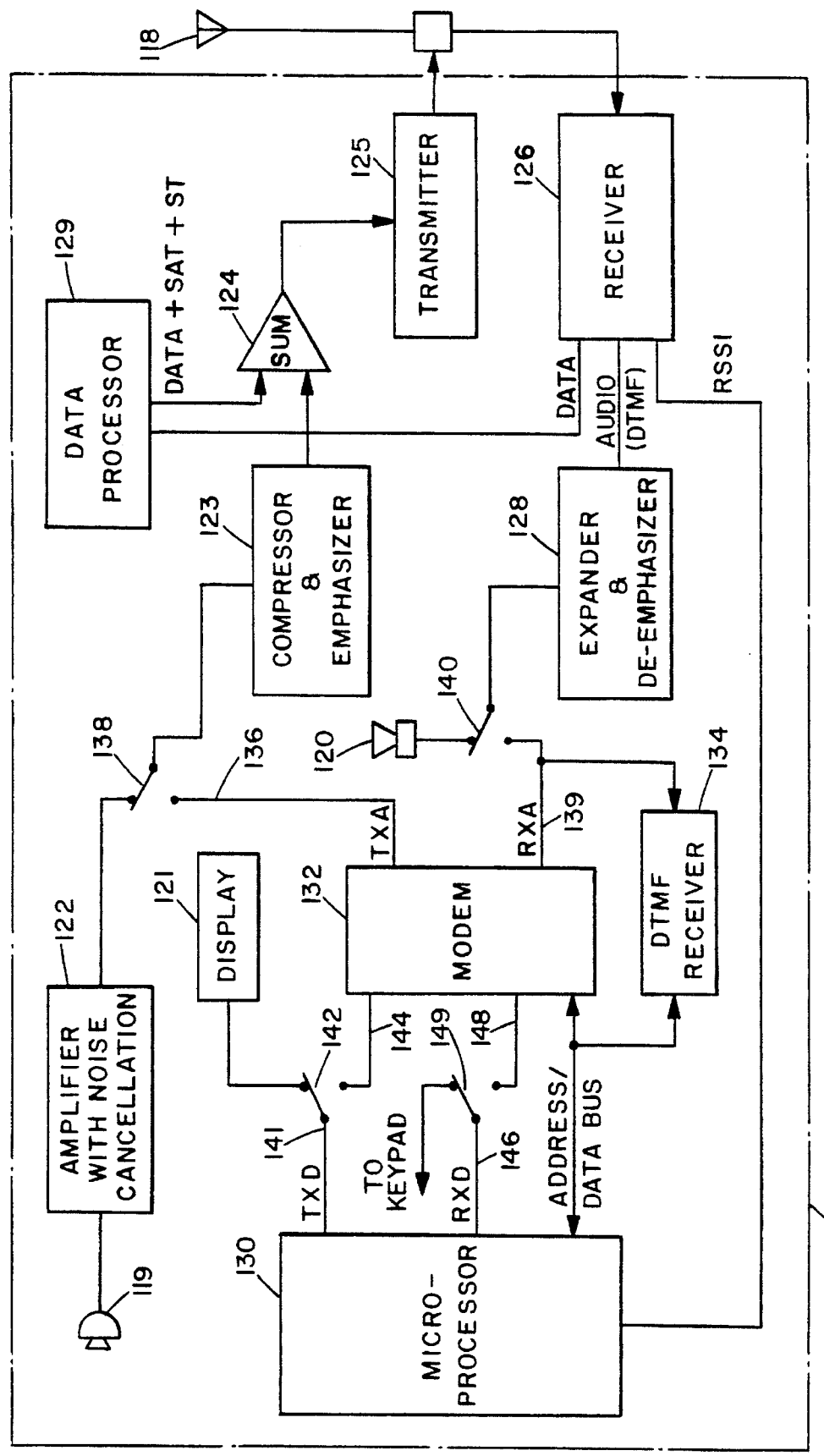
FIG. 11 is a block diagram of another embodiment of a modified mobile or portable phone unit for use in the system of FIG. 10.

FIGS. 10 and 11 illustrate a tracking system according to a second embodiment of the invention. Some parts of this system are identical to the first embodiment, and like reference numerals have been used for like parts as appropriate. The system basically comprises a modified portable phone unit 110 which may be carried by an individual at all times, and a central processing or monitoring station 14 for receiving alarm signals emitted by the phone unit 110 and computing an approximate position for the portable phone unit based on these signals. As in the previous embodiment, station 14 may be a fixed site or may be mobile. The system makes use of an existing wireless telephone system, which comprises a cellular telephone system in the illustrated embodiment. However, it may alternatively use other types of wireless telephone systems such as the proposed personal communication system having a much larger number of cell or receiver/transmitter sites than the existing cellular network.

In the illustrated embodiment, radio transmitters or cell sites 16 each cover a predetermined cell area. In the case of the existing cellular network, each cell has a radius of the order of 3 to 5 miles. Currently proposed wireless telephone networks may have a cell or transmitter radius of 100 meters to ¼ mile, and these networks will therefore be much denser. The system of this invention may be used with the existing cellular network or future networks having more cell sites. Cell sites covering a predetermined region are linked to a local MTSO 18 and to telephone company central office 19. As in the previous embodiment, alarm signals 111 are emitted from unit 110 and are transmitted to the closest adjacent cell site 16 and from there through MTSO 18, central telephone office 19, and the central monitoring station 14.

The modified portable phone unit is illustrated in more detail in FIG. 11. The components of the unit as illustrated in FIG. 11 are all enclosed in a unitary, portable phone housing 112 which has a conventional keypad 114 for dialing selected telephone numbers and additionally has a panic button 116 for pressing by the person carrying the unit in the event of an emergency. The unit also has an antenna 118 which may be retracted when the unit is not in use. The unit also includes a microphone 119, an ear piece 120, and display 121.

Unit 110 includes all basic components of a conventional portable phone unit. A rechargeable battery (not illustrated) is provided for providing power to the circuitry. Microphone 119 is connected via amplifier 122, compressor and emphasizer 123 and summer 124 to transmitter 125, which in turn is connected to antenna 118. The antenna 118 is also connected to receiver 126, which is connected via expander and de-emphasizer 128 to ear piece 120. Data processor 129 is connected to summer 124 and to receiver 126. All of the components described so far are standard portable phone components.

A microprocessor 130 is connected to display 121, and to a modem 132 and a DTMF receiver 134. The modem 132 has a transmit analog output 136 selectively connected via two way switch 138 to the transmitter 125 via compressor and de-emphasizer 123 and summer 124. Switch 138 alternatively connects to the output of microphone amplifier 122. Modem 132 also has a receive analog input 139 selectively linked via two-way switch 140 to the audio output of receiver 126. Switch 140 alternatively connects the receiver to ear piece 120 for audio mode operation. A transmit digital output 141 of the microprocessor is connected via two position switch 142 to a modem input 144, while a receive digital input 146 of the microprocessor is connected to a modem output 148 via two position switch 149. Switch 142 selectively connects output 141 to display 121, while switch 149 selectively connects the input 146 to the keypad output, including the panic button.

The hardware components added to a standard portable phone unit to produce the modified portable phone unit of this invention are the modem 132, the DTMF receiver 134, and the four two position electronic switches 136,140,142 and 149. The four switches switch the unit between the audio mode or upper switch position as illustrated in solid outline in FIG. 11, and the lower position or modem mode as illustrated in dotted outline in FIG. 11. In the audio mode, the unit operates as a conventional portable phone for audio communications between the unit and a dialled or received telephone number. The modem mode is used when a person actuates the panic button in the event of an emergency situation in which they need assistance. In addition to the hardware additions, the software in the microprocessor is also modified as described below to control the modem or emergency mode of operation.

In addition to the normal data stored in a conventional portable phone microprocessor, the microprocessor 130 also has alarm information stored in its memory for use in the event of an emergency. This information will include primary and secondary phone numbers to be contacted in the event of an emergency, user identifying information, and various unit parameters, as well as a unique password or PIN number.

Figure 12:
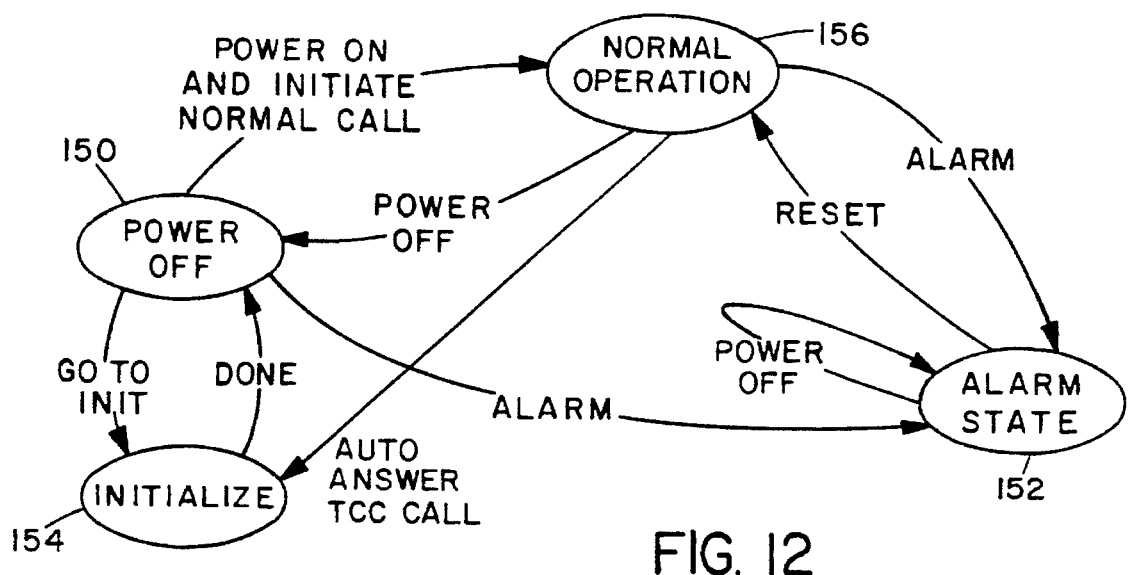
FIG. 12 is a schematic flow diagram illustrating the operating states of the portable phone unit.

The microprocessor is programmed to monitor the keypad input and to switch all four switches together between the audio and modem mode in the event that the panic button is actuated. The portable phone unit has four possible operating states, as illustrated in FIG. 12. In the OFF state 150 no actions are carried out, but the system is able to go to the ALARM state 152 on user initiation. In the INITIALIZE state 154 the system is able to receive updates to its data base. In the NORMAL OPERATION state 156 the unit operates as a normal cellular or portable telephone, and is able to go to the ALARM state on user initiation. In the ALARM state, the portable unit contacts the remote monitoring station and transmits an emergency signal repeatedly to that station, much as in the first embodiment described above, and as generally illustrated in FIG. 10.

The unit enters the OFF state on completion of a normal call when power is turned off to the unit. It also enters the OFF state on completion of an initialization procedure in the INITIALIZE state. The unit exits the OFF state in any one of three different ways. Firstly, the unit goes from OFF to INITIALIZE on receipt of a special command, which may be manually input on the unit keypad or may be received via a remote command from the central monitoring station. Secondly, the unit goes to the NORMAL state when power is switched on. Thirdly, the unit goes to the ALARM state when an alarm condition is satisfied (i.e. the subscriber depresses the panic button 116).

When no emergency condition exists, the unit can be operated conventionally as a portable or cellular phone.

An alarm is initiated by the user hitting the designated alarm or panic button on the keypad rapidly and more than twice in a row, to eliminate or reduce the risk of accidental alarm initiation. The unit does not display any indication that the ALARM state has been entered. Once the ALARM state is entered, the unit switches to modem mode and commences scanning inputs from adjacent cell or transmitter sites 16 and storing the received cell identifying and signal strength information. The unit continuously scans all adjacent cell site control channels and collects all verified cell site data for the six most powerful received cell sites. The received data is replaced with the latest scanned data as soon as a transmission attempt has been completed.

Simultaneously with the unit commencing to scan all received cell site data via line 160 from receiver 126, the unit also initiates a call to the remote, central monitoring station 14 via cell site 16, MTSO 18, and telephone company central office 19. The unit is typically programmed with at least two phone numbers to contact in the event of an emergency, and will attempt first to contact the primary number. If this is unsuccessful after three attempts, the unit Woes to the secondary number and tries to connect with this number at least two times. The unit then returns to the first number, and restarts the calling sequence. The process continues until either a successful connection is made or the ALARM mode is disabled.

Once the monitoring station has been reached, information is transmitted via modem 132 to the transmitter for transmission of a data packet corresponding to the desired emergency information to the monitoring station. The packet transmitted will include information that this was a user-initiated emergency call, user/owner identifying information, the result of the scan of adjacent cell site control channels, DCC code, an assigned voice channel, and a system ID. The same packet will be sent repeatedly at predetermined time intervals of at least once every 10 seconds as long as the unit is in the ALARM mode. The cell site identifying and received signal strength information, as well as the assigned voice channel data, will be covered with a pseudo noise sequence or have a code which enables or disables transmission.

Figure 4:
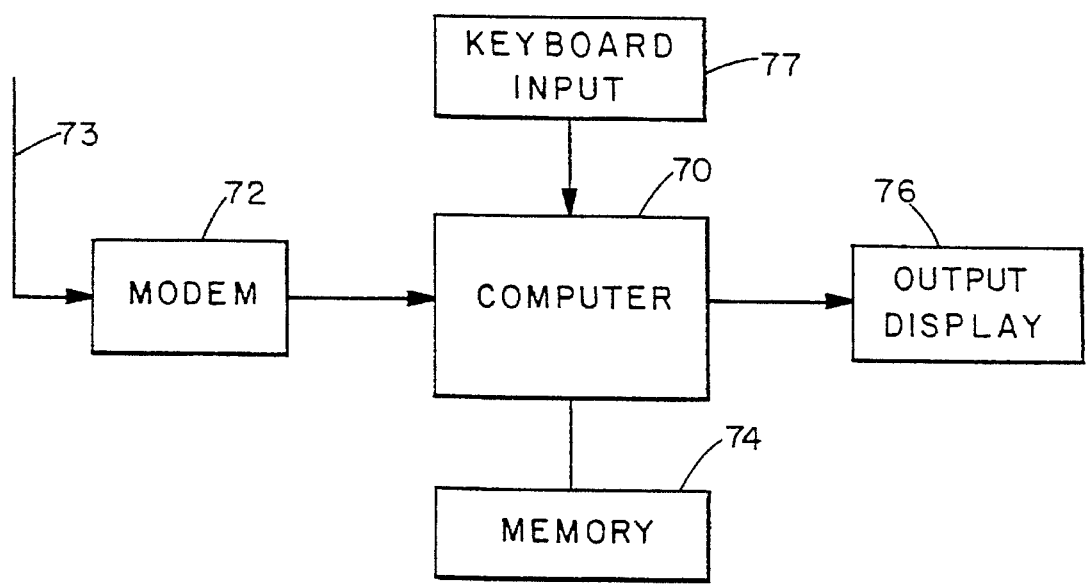
FIG. 4 is a schematic block diagram of a central monitoring station forming part of the system of FIG. 1.

The central monitoring station will have a computer linked to a modem for direct input of the received data packet, as illustrated in FIG. 4 of the previous embodiment. The computer 70 will operate in the case of input from a hand held portable phone in much the same way as illustrated in FIG. 5 above, except that there will be no velocity indicator needed between stages 85 and 86 and 86 and 87, and the data packet input 79 will be from the portable phone unit, which will not necessarily be in a vehicle.

The incoming data packet is processed by the computer at the central monitoring station to determine the approximate location of the portable phone unit emitting the emergency signals. As in the previous embodiment, the computer will include stored databases of information on cell site locations. This can be used in conjunction with the received cell site information from the portable phone in order to compute an approximate location of the individual carrying the portable phone.

The computation of the approximate location of the victim or individual will be dependent on the nature of the wireless telephone system used. In existing cellular phone systems, the cell site diameter for each individual cell is of the order of 3 to 5 miles, so simply knowing the location of one cell from which the portable phone is receiving signals will be insufficient to pinpoint the approximate location of the victim. Thus, the approximate position may be determined based on the received signal strengths of two or more adjacent cell sites picked up by the portable phone, as described above in connection with the previous embodiment. Sectoring information may alternatively or additionally be used to calculate the approximate position.

However, it is likely that new wireless telephone systems will shortly be introduced in which a much denser array of cells, both inside and outside buildings, is used. The cell or transmitter/receiver radius in such systems is likely to be $\frac{1}{3}$ to $\frac{1}{5}$ of that of existing cellular telephone networks, or of the order of $\frac{1}{2}$ Km to 1 Km. In this case, simple identification of the cell site or channel from which wireless signals are being received by the portable phone may be sufficient for approximate victim location. If not, other techniques such as signal strength information and sectoring information may also be used in these systems, if necessary.

In a cellular system, each cell site will use a particular control channel and DCC (digital color code), and this information may be used to extract a cell site location. However, in current cellular systems covering relatively large areas, a very large number of cell sites is involved, and some of the cells will use the same control channels and DCC. This is typically true in large cities. Thus, the control channel information and the DCC code received at the monitoring station may be insufficient to identify the exact cell position. The computer at the remote monitoring station is therefore preferably programmed to perform an ambiguity resolution process if the tracking system is used with any wireless telephone network in which control channels are reused. This procedure is illustrated in the flow diagram of FIG. 13. The procedure utilizes a data base composed of a matrix formed by cell sites which are in near enough proximity to one another that a signal processing unit hearing one cell site has a good chance of receiving the others as well. Thus, even if one channel corresponds to two or more cell site locations, each of those cell sites will be adjacent to cell sites having different channels. This is illustrated in an example of part of an existing cellular network given in Table 1 below.

TABLE 1

| Loc ID | Channel | 313 (1) Solana B. | 313 (2) Balboa | 314 Ivanhoe | 315 1011 Cm. Del Rio S. | 316 (1) Treena St. | 316 (2) Morena |
|---|---|---|---|---|---|---|---|
| Solana Beach | 313* | 0.00 | — | — | — | — | — |
| Balboa | 313* | — | 0.00 | 9.83 | 8.31 | — | 3.30 |
| Ivanhoe | 314 | — | 7.92 | 0.00 | — | — | 5.33 |
| 1011 Cam. Del Rio S. | 315 | — | 7.04 | — | 0.00 | — | — |
| Treena St. | 316* | — | — | — | — | 0.00 | — |
| Morena Blvd. | 316* | — | 3.03 | 6.07 | — | — | 0.00 |
| Camino del Rio | 317* | — | 9.09 | — | 4.75 | — | — |
| Del Mar Heights | 317* | 6.54 | — | — | — | 9.55 | — |

Thus, even though in the above example channel 313 corresponds to two different cell locations, only one of those locations is adjacent to cell sites having channels 314,315, 316, and if the signal processing unit hears these cell sites in addition to 313, the location can be identified. The entries in the table correspond to distance in kilometers between cell sites. Only cell sites at a distance of less than or equal to a certain distance, such as 10 Km, are kept in the table.

Any cell site having a channel which is used by one or more other cell sites is a so-called ambiguous cell. Cells having the same control channel may have different digital color codes assigned, in which case the ambiguity may be resolved by checking the digital color code of the received cell.

Figure 13:
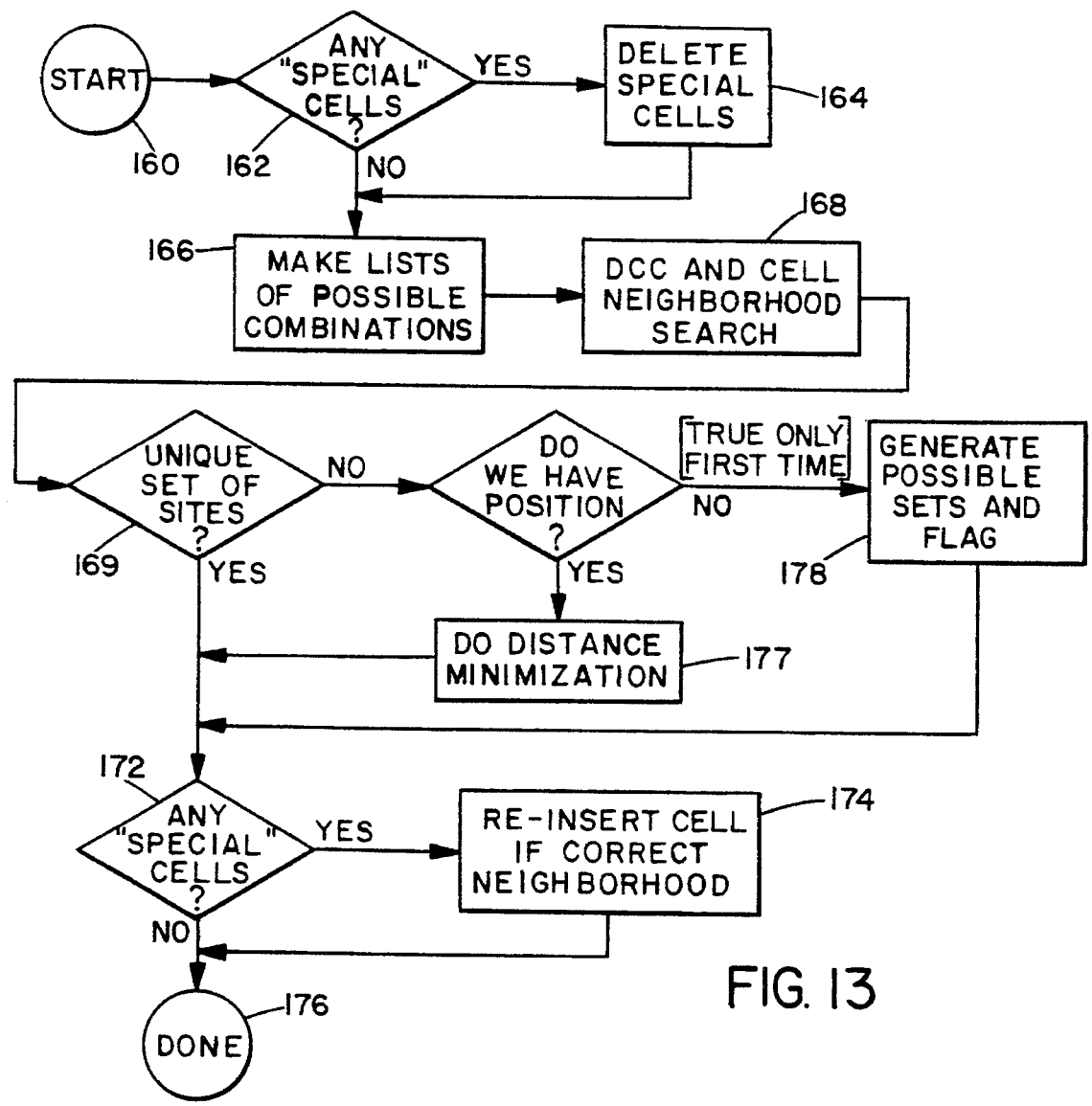
FIG. 13 is a flow diagram of an ambiguity resolution process for use in the system.

Both digital color code and cell neighborhood identification are used in the ambiguity resolution process illustrated in FIG. 13. At the start 160, incoming channel information is received and the data is checked to see if the channel data includes any so-called "special" cell sites in the list, in step 162. Special cell sites will be stored in the computer data base and are cell sites which have anisotropic radiation characteristics that cannot be accounted for without knowing a position. These are removed temporarily from the received channel information in step 164 because they may otherwise erroneously influence the cell site identification process.

Figure 14:
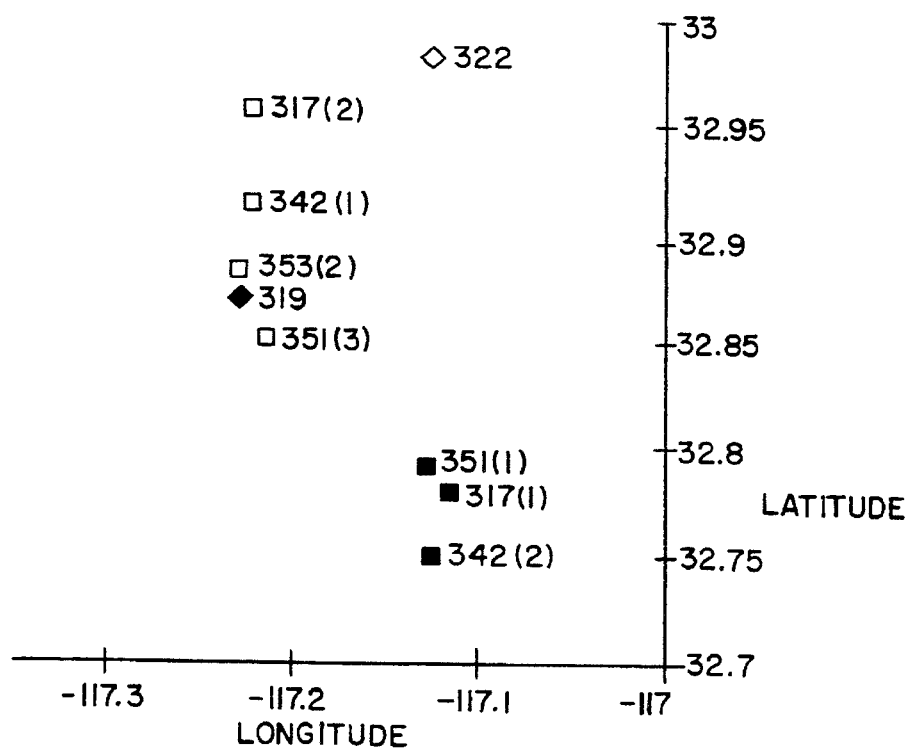
FIG. 14 is a graphical representation of the geographic location of a cluster of cell sites.

Once special cell sites have been removed, the received control channel information is ordered and a list of cell site neighborhoods is generated (step 166) using the stored data to produce a table similar to that in Table 1 above. The list is first checked in steps 168 to see if any ambiguous cells received have differing color codes. If so, the received color code information can be used to resolve the ambiguity in step 169. If ambiguities cannot be resolved this way, the "nearest neighbor" list is scanned in step 169 to determine if any of the cells are unique, in other words if the input list contains one or more channels which have only one assigned cell site. This allows the most likely correct set of cell sites to be chosen using input from the unique channels. In other words, if one or more of the received control channels are unique, and other non-unique channels are also received which have some sites adjacent the unique channels, the other possible sites for the non-unique channels can be eliminated. In other words, if you have one or more unique cells, and more than one possible cluster of non-unique cells, the cluster is chosen which is closest to the unique cells heard. If this allows all received control channels to be resolved, a unique set of sites can be generated in step 169, as illustrated in FIG. 14. In the illustrated example, channels 319 and 322 are unique channels. In view of this, the upper cluster rather than the lower cluster will be selected, since it is closest to the unique channels.

If any special cell sites were removed (step 172), and they correspond to the resolved neighborhood, the special cell locations are reinserted into the data at step 174, and the ambiguity routine is done (step 176). The generated position information is then provided to the next stage of analysis, i.e. generation of a map of the area containing the resolved cell sites on the screen at the monitoring station.

However, where the most likely correct set of cell sites based on unique control channels does not account for all received control channels, a higher level analysis is desirable, and perhaps necessary. This analysis is performed at step 177. In this case, closest neighbor lists are generated for each of the control channels in the most likely set, and a list of the "most chosen" cell sites is generated.

Figure 15:
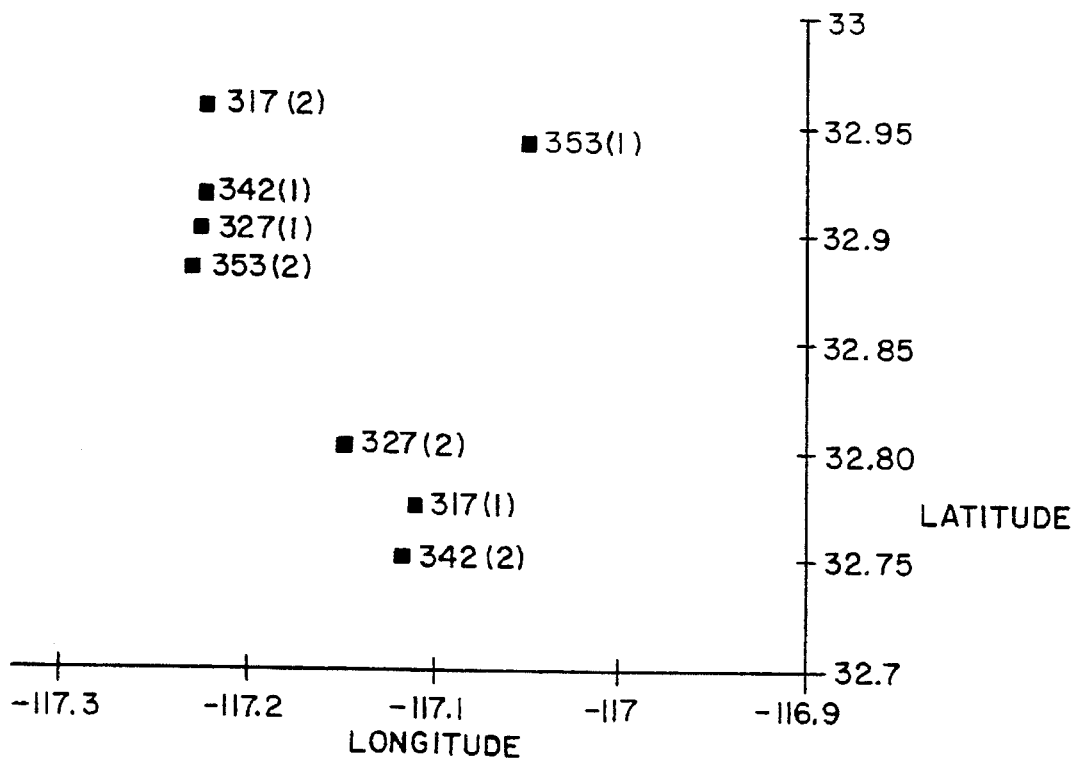
FIG. 15 is a graphical representation similar to FIG. 14 illustrating another grouping of cell sites.

In the case where a set of channels are heard which all have two or more possible locations, as illustrated in FIG. 15, closest neighborhood lists are generated for each of the cell site locations. This will result in at least 2 N lists, where N is the number of channels heard and each channel has two possible locations. The number will be greater where the channels have more than two possible locations. Each of the lists will have up to N entries, since only channels actually heard are included on each list. In making the lists, the channels are ordered according to power. The lists generated for the two highest power received channels are used to generate common lists of nearest neighbors by forming the intersection of the two sets. In other words, if channels A and B are the highest power channels received, and each channel has two possible locations A(1),A(2) and B(1),B(2), the following intersections are formed: A(1),B(1);A(1), B(2);A(2),B(1): and A(2),B(2).

This procedure will normally give two, or perhaps three, non-intersecting sets, in other words sets of positions which are so far apart that they cannot be correct. Thus, one or more possible solutions will be generated. If two solutions are generated where one of the solutions has a channel far outside either of the neighborhoods, the other solution is likely to be correct. If a unique set of cell sites is generated at this point in step 177, a distance minimization calculation is performed at step 178.

This situation is illustrated in the example of FIG. 15. In this case, channels 317,327,342 and 353 are all heard, and each of the channels have two possible positions which are plotted in FIG. 15. However, channel 353 has a cell site 353(1) which is far from either of the possible neighborhoods. Assume in this example that channel 342 has the highest power and channel 327 the next highest power in this example. If channel 353 is deleted from the set, it can be seen that there are two possible solutions: the set {317(2), 327(1),342(1)} and the set {317(1),327(2),342(2)}. With channel 353 included in the received data, it can be seen that the first of these two sets is the most likely. This can also be calculated by calculating the center of mass (not weighted by power) of the sets of sites, and computing the distance from the center of mass to any cell site in each set. Any set or group of sites that has one or more cell sites more than a certain distance from the center of mass, for example 8 Km, is rejected.

The distance D from a cell site to the center of mass is computed as follows, by a distance minimization procedure:

$$D = R_e \times \arccos\ [\sin(lat_c)\ \sin(lat_i) = \cos(lat_c)\ \cos(lat_i)\ \cos(\Delta Long)] \quad (3)$$

where $\Delta$ Long=$Long_i$−$Long_c$, i=cell site and c=center of mass position, and $R_e$=earth radius (3963 miles).

This distance is then normalized to account for the greater range of some cell sites (i.e. with greater RSAC or remote service area coverage, a position will be seen as "closer" than the actual geographic position) as follows:

$$D' = D \times [RSAC_{ave}/RSAC_i] \quad (4)$$

RSAC=Remote Service Area Coverage factor, reflecting how far a cell site antenna receive/transmit signal will travel. The distance D' is thus calculated for each detected cell site and any group which has one or more cell sites further than a predetermined distance, for example more than 8 Km, from the calculated center of mass c, is rejected. Care must be taken to watch out and account for any special cells that have special propagation characteristics which can make the distance calculations yield accidentally erroneous results, for example cell sites near water or in canyons.

If this procedure still does not result in identification of a unique set of cell sites, and the victim or portable unit is moving, more cells will be collected and eventually a unique cell is received. If the portable unit is stationary, all possible sets are forwarded to the position calculator in step 179, and more than one possible victim position is then tracked.

In the event that the object being tracked is moving, which will normally be the case where it is a vehicle as in the first embodiment described above, and may also be the case when it is an individual carrying a portable phone, the position calculation is ongoing since the received channels will change as the vehicle or individual moves, and eventually a unique list can be generated by keeping track of all possible positions. Eventually an anomaly will result, such as a unique cell site or unrealizable neighbors, and the ambiguity can be resolved.

Once a unique set of cell sites has been generated, or two or more possible sets have been generated which cannot be resolved, the most probable set or sets are provided to the position calculator. The signal strength data is then used as described above in connection with the first embodiment to generate an approximate victim location. This location is displayed on the map generated on the computer screen as a red dot or the like. The operator then dispatches one or more field response or emergency vehicles (FRU) 180 towards the estimated location, as illustrated in FIG. 10. Each dispatched unit or vehicle 180 will have a radio frequency direction finder 182 for homing in on the portable phone output signal once it is in the vicinity of the phone unit. This may be a conventional radio direction finder, but in the preferred embodiment of the invention a modified radio direction finder is used which is designed to home in on the actual cellular or portable phone unit being tracked. In other words, direction finder 182 homes in on the voice channel frequency of the portable phone unit, which is transmitted repeatedly as part of the emergency signal.

The direction finder 182 comprises a conventional Doppler Shift direction finder which is modified by setting the target frequency of the direction finder to match that of the voice channel frequency emitted by the portable phone unit, and to allow the SAT color code (SCC) of a received signal at the target frequency to be extracted from the signal and displayed. The direction finder will therefore search for a cellular phone that emits a modulated carrier wave whose voice channel frequency has been monitored by the central monitoring station, which conveys this information via cellular phone voice link, to the direction finder operator in the field. However, since there may be several phones using the same voice channel frequency within the system at any one time, particularly where the cell density is very high, simply homing in on the voice channel frequency may result in the tracking vehicle homing in on the wrong phone unit. In order to reduce or avoid this risk, the direction finder is additionally modified to search for a specific voice channel frequency and a specific SCC (SAT color code) assigned to the phone unit.

Figure 16:
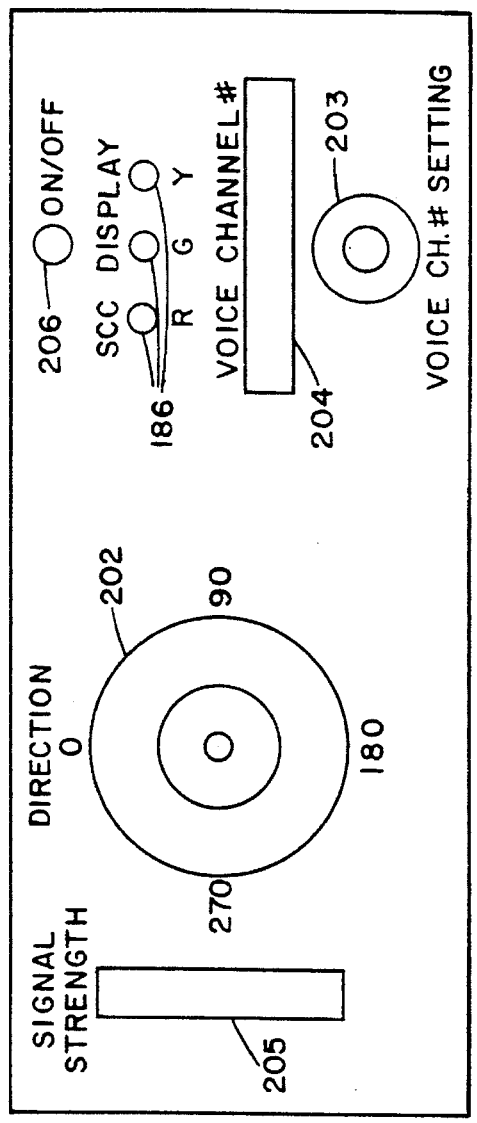
FIG. 16 is a view of the front panel of a modified radio frequency direction finder for use in the system of FIG. 1 or FIG. 10.
Figure 17:
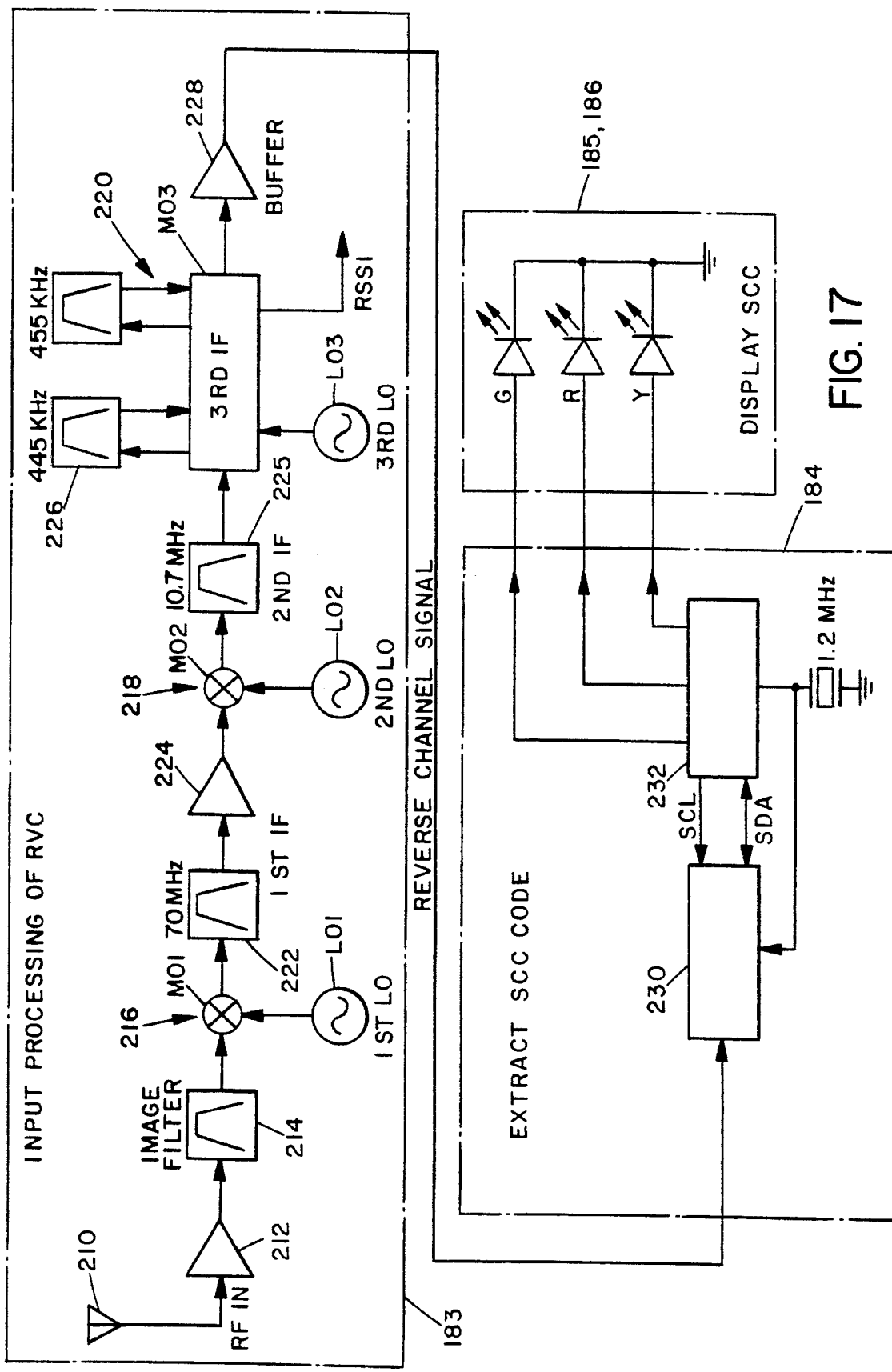
FIG. 17 is a schematic circuit diagram of the direction finder of FIG. 16.

For every initiated call in a cellular network, the network assigns a voice channel and a SAT tone on initiation of the cellular connection. There are three unique SAT tones and each is assigned a unique color code, or SCC. Although there are only three SCC or color codes, this code will normally suffice to distinguish between two different phones having the same voice channel frequency in the same general vicinity. FIG. 16 illustrates the front panel of the modified direction finder 182, and FIG. 17 is a circuit diagram illustrating the direction finder circuitry added to a conventional direction finder to enable the color code to be extracted and displayed. An input circuit 183 is provided for receiving the reverse voice channel or RVC from the phone unit. The output of circuit 183 is connected to a decoder circuit 184 which decodes the SCC SAT color codes from the voice channel signal. As discussed above, there are three possible different color codes which may be assigned to each SAT tone of a voice channel. The output of the decoder circuit 184 is connected to a driver circuit 185 to drive or ignite any one of three colored LED lights 186 which will be provided on the front panel of the direction finder. The lights 186 will be three different colors, for example green, red and yellow, and the operator will know the color code based on which of the three lights is illuminated in sequence, for example, red, green, green.

The front panel of the direction finder 182 includes a conventional direction indicator 202 for indicating the direction of a received signal at the target frequency, and a potentiometer dial 203 for setting the target frequency. LED display 204 displays the target frequency or voice channel number. A signal strength indicator 205 indicates the strength of the received signal. Also provided on the front panel is an on/off switch 206 and the three LEDs 186 comprising the SCC or SAT color code display.

FIG. 17 illustrates the circuitry for controlling the three LEDs 186 in more detail. It will be understood that the remainder of the direction finder circuitry for homing in on the target frequency and displaying direction and signal strength is of a conventional nature. The input circuit 183 is a conventional heterodyne three stage radio receiver that handles the received radio frequency or reverse voice channel signal and demodulates the signal to extract the three color code data elements in the reverse voice channel or RVC signal. This is equivalent to circuitry used in existing cellular telephone systems to perform this function, and equivalent decoding circuitry is incorporated in a conventional direction finder in order to allow the color codes to be demodulated and displayed on the front panel of the direction finder. The radio frequency signal received by the antenna 210 is amplified by input amplifier 212 and filtered by image filter 214. The circuit consists of three stages 216,218 and 220 of down converters from a received high frequency, in the 800 MHz range, down to 455 KHz. Each down converter stage 216,218 and 220, respectively, consists of a local oscillator LO1,LO2 and LO3, respectively, and a mixer circuit M1,M2 and M3, respectively which subtracts the input radio frequency signal from the local oscillator fixed frequency. The output from converter stage 216 is fed via 70 MHZ filter 222 and amplifier 224 into the next stage, while the output from the second stage is fed via 10.7 MHz filter 225 to the final stage 220, which incorporates two 455 KHz filters 226. The demodulated data containing the reverse voice code information is fed to a buffer amplifier 228.

The output of buffer amplifier 228 is fed into the decoder circuit 184, where the demodulated data is connected to processor unit 230 and general purpose controller 232. Processor unit 230 is preferably a UMA1000LT special purpose processor and controller 232 is preferably a PIC16C71 general purpose controller. Controller 232 is programmed to extract the SCC or color code information out of the RVC data stream, and to decode the SCC so that the appropriate color LED 186 is activated and displayed on the front panel of the direction finder.

The dispatcher at the central monitoring station will instruct the driver of a tracking vehicle to turn on the direction finder unit and set the voice channel number at the correct frequency corresponding to the assigned voice channel of the cellular phone unit being tracked, using dial 203 and display 204. The dispatcher will also tell the driver the correct SAT color code for the signal to be tracked. The driver then tracks incoming signals at the correct frequency based on the signal strength 205 and direction display 202. The driver will observe the LEDs 186 to determine the SAT color code of the signal being tracked. If the SAT color code displayed matches the code given to the driver by the dispatcher, the driver knows that the target being tracked is correct. If the code does not match, the driver breaks off from tracking that signal and looks for another signal at the correct frequency with a matching color code.

The operator at the central monitoring station will be continuously monitoring both the voice channel and the SCC of each phone calling for help, and this information will be conveyed via voice by the operator to the tracking vehicle 180 in the field. The direction finder operator will enter the voice channel frequency information into the direction finder in the conventional manner, and will observe the display of the SCC code on the direction finder panel to see if it matches the SCC code given to him or her by the operator at the central monitoring station. If the SCC codes match, the tracking vehicle driver will know that the phone unit is correctly identified and will home in on its signal.

The direction finder may optionally be provided with the capability of searching for, and matching, a third possible condition. This is the ESN or electronic serial number, which is a unique number assigned to every cellular phone. The operator of the direction finder will be apprised by the central monitoring station of three factors or conditions for the target phone unit, in other words the voice channel frequency, the SCC and the ESN. The voice channel frequency and ESN will be entered into the direction finder while observing the SCC display. If all three factors match the target phone, the search for distance and direction will result in discovery of the exact location of the target phone.

It will be understood that the same tracking and location system as described above in connection with FIGS. 12–17 may also be used with the first embodiment described above, where the cellular phone unit is mounted in a vehicle.

Figure 18:
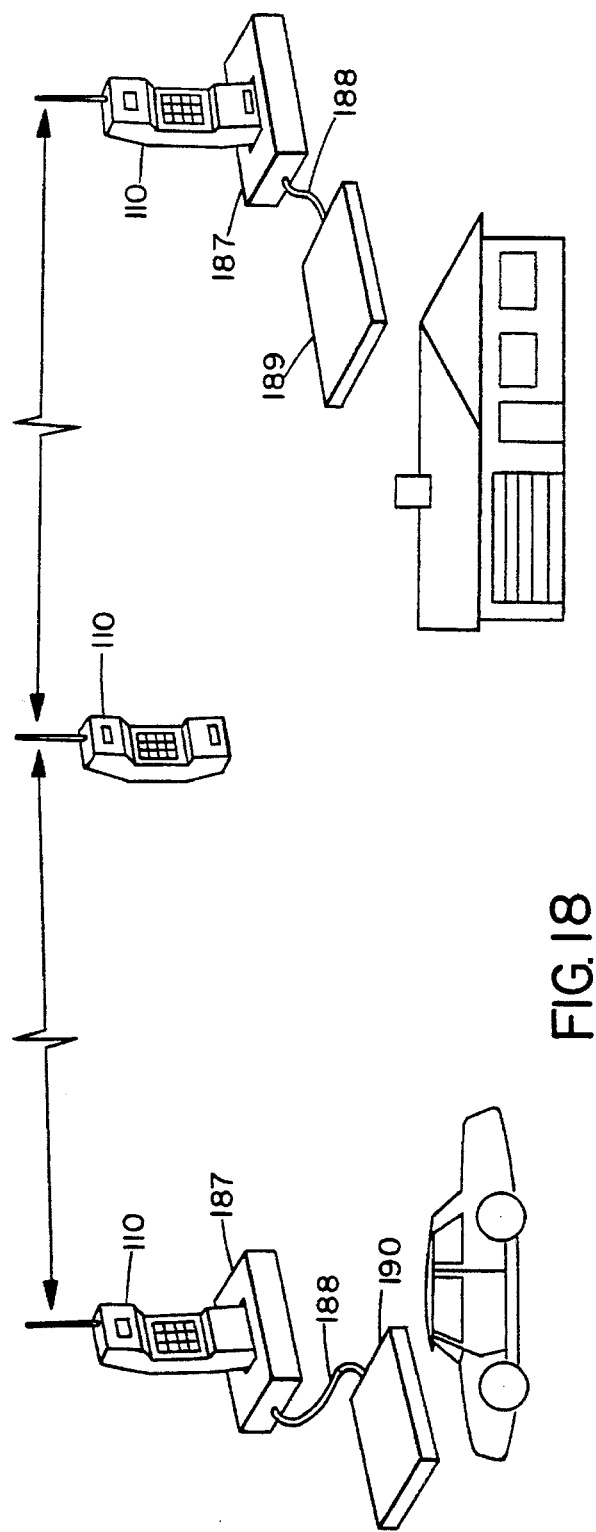
FIG. 18 is a block diagram of an integrated home, vehicle and personal alarm system according to another embodiment of the invention.
Figure 19:
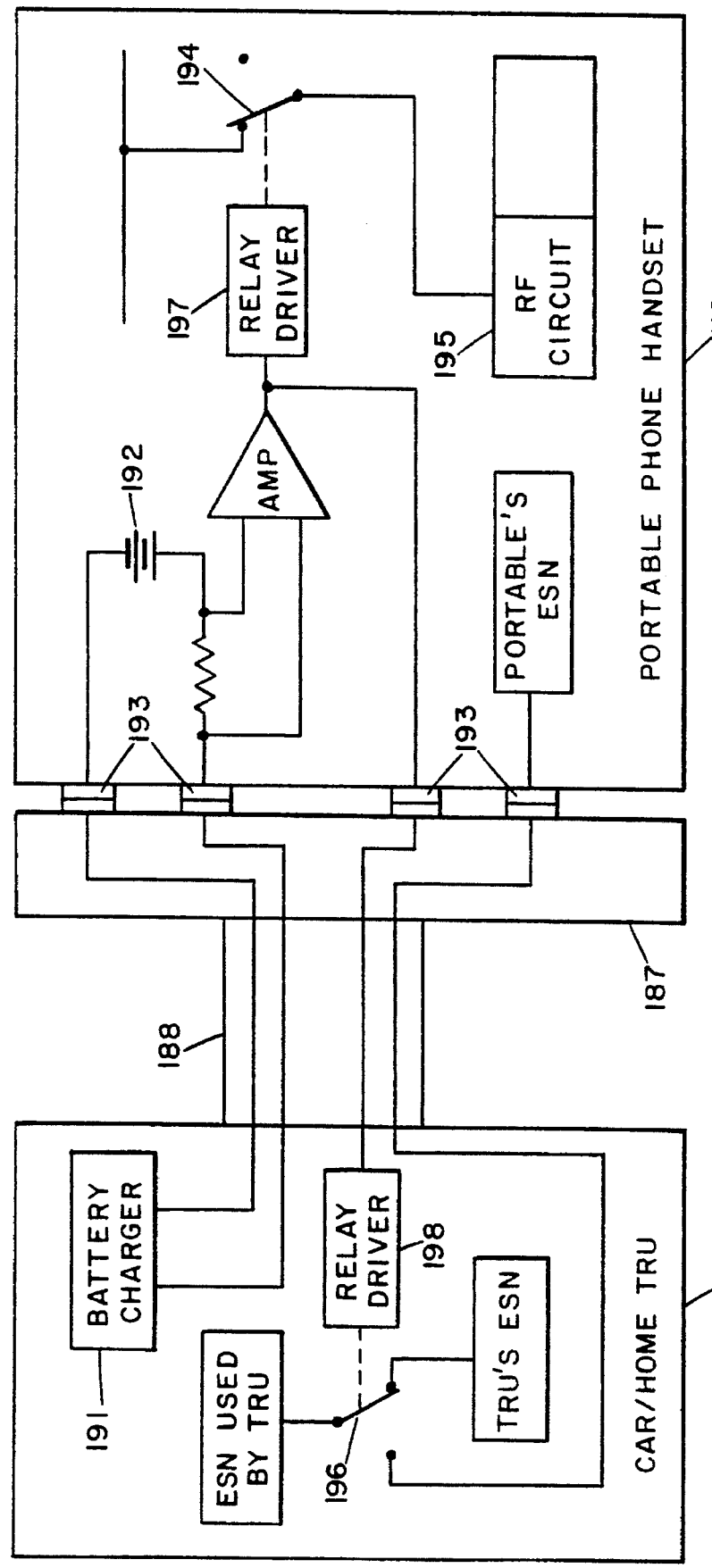
FIG. 19 is a schematic block diagram of one of the portable unit receptacles and part of the mobile and portable unit of FIG. 18.

The portable phone unit as illustrated in FIGS. 10 and 11 may also be used in conjunction with a vehicle alarm unit as illustrated in FIGS. 1–3 and a home alarm system as described in my co-pending application Ser. No. 08/074,034 referred to above, the contents of which are incorporated herein by reference, in an integrated system as illustrated in FIGS. 18 and 19. The portable phone unit or handset 110 will then be designed to plug in to a suitable receptacle 187 connected by cable 188 to the home alarm unit 189 when the individual is at home, or to an identical receptacle 187 connected by cable 188 to car alarm unit 190, as illustrated in FIG. 18. When the individual leaves home to go out, they simply unplug the portable phone from the receptacle 187 in their home, and plug it in to the corresponding receptacle 187 in their vehicle, where it can remain while driving to a destination. At the destination, the individual unplugs the portable unit from the car alarm receptacle, and carries it with them until they return again to the vehicle. With this arrangement, the individual can be reached at all times at a single phone number, whether they are at home, in their vehicle, or elsewhere. At the same time, they are protected at all times by the alarm system which can alert a central monitoring station in the event of a break-in in their car or at home, or in the event of another emergency situation arising when they are away from their home or vehicle. The car and home alarm systems will be active whether or not the portable unit is plugged in, for providing alarm signals in the event of a break-in, fire or the like.

FIG. 19 illustrates the receptacle 187 as well as part of the circuitry in the home alarm, car alarm and portable units in more detail. Only the parts of the circuitry associated with plugging in and unplugging of the portable phone unit are illustrated in FIG. 19, and the home, car and portable units will otherwise be identical to those described in co-pending application No. 08/074,034 referred to above, and in connection with FIGS. 2, 3 and 11 above, respectively, and will not be described in detail here. The home alarm unit, car alarm unit and portable unit will each have their own ESN or assigned electronic serial number. The portable phone unit can operate as a stand-alone transceiver as described above in connection with FIG. 11, or as a handset for a transceiver when plugged into receptacle 187.

As best illustrated in FIG. 19, the home alarm and car alarm units are preferably each provided with a battery charger 191 which will be connected to the portable unit's battery 192 whenever the portable unit 110 is inserted in the respective receptacle. This allows the portable's batteries to be recharged whenever the user is in his or her car or at home, and also allows the portable to be used as a handset for the car or home wireless phone system at these times. When the portable phone is being carried by the individual away from the car or home, it operates exactly as described above in connection with FIGS. 10–15. When plugged into receptacle 187 connected to the home or vehicle alarm unit, contacts on the base of the phone unit 110 will engage corresponding contacts 193 in the receptacle, connecting circuitry in the phone unit to circuitry in the alarm unit 189,190. A switch 194 in the phone unit will move from the position illustrated in solid line in FIG. 19 to the position illustrated in dotted lines when contact is made, disconnecting the rf and some logic circuitry 195 used for the alarm function in the portable unit from the power source while the battery is recharged. The portable phone unit will then act as a dumb handset. Similarly, a switch 196 in the home or car alarm unit will move from the position illustrated in solid line in FIG. 19 to the dotted line position as soon as contact is made, so that the ESN of the portable phone is used in alarm or voice transmissions. Switches 194 and 196 are operated by relay drivers 197 and 198, respectively, to move between the portable "OUT" and "IN" positions. Apart from the relay drivers and switch, and the battery charger, the home alarm unit 189 will be exactly as described in co-pending application Ser. No. 08/074,034 referred to above, and the car alarm unit 190 will be exactly as described above in connection with FIGS. 1–3. Similarly, the portable phone unit circuitry will be as described above in connection with FIG. 11, with the addition of the switch and relay driver for switching the unit between independent and dumb modes of operation.

The portable phone may be used by the subscriber anywhere. Because the batteries of portable phone units must be recharged frequently, it will be more convenient for the subscriber to use the portable unit while away from his or her home or vehicle. When the subscriber is at home or in the vehicle, the portable is simply inserted into the receptacle 187, and the batteries will be recharged automatically, while the portable unit is used as the handset at the home or in the vehicle. The subscriber can thus be reached at the same number whether at home, in the vehicle, or elsewhere. The ESN of the portable phone will be used when the phone unit is used as a stand-alone unit or as a handset to the phone or car alarm unit.

The home phone and alarm unit may be used with or without a handset. With no handset, it provides for perimeter, fire and interior protection as described in my application No. 08/074,034 referred to above, without the subscriber presence. If the home unit is operating as a stand-alone unit, it uses its own ESN in transmitting alarm data. If the portable unit is plugged in as the home unit handset, any alarm or voice transmissions use the portable's ESN.

Similarly, the car phone unit 189 may be used with or without a handset. With no handset, it provides for break-in and towing protection without the subscriber being present. The car unit will activate a two-way communication automatically if a break-in occurs, so that an operator at the central monitoring station can listen in and/or talk to whoever is in the car at that time, to determine the legitimacy of the event. If the car unit is operating as a stand alone unit without the portable phone unit or handset, it will use its own ESN to transmit alarm and location data. If the portable unit is plugged in, any alarm and location data and voice transmissions use the portable's ESN.

This system allows computation and tracking of the approximate location of a vehicle or a person on foot carrying a portable phone unit, using the existing cellular or other wireless phone network and without requiring any modification of the existing network. The system allows individuals to summon assistance in an emergency situation at all times, whether at home, in a vehicle, or in any other location while carrying the modified portable phone unit. The modified phone unit incorporates all the hardware and software necessary to generate and transmit emergency signals when the individual pushes a simple panic button, and the central monitoring system is capable of computing an approximate location based on the signals received from the phone unit, and of directing tracking vehicles to the approximate location where they may use direction finder equipment to home in on the phone unit output signals.

Although some preferred embodiments of the invention have been described above by way of example only, it will be understood by those skilled in the field that modifications may be made to the disclosed embodiments without departing from the scope of the invention, which is defined by the appended claims.

I claim:

1. A tracking system for tracking a movable object, comprising:

an array of fixed wireless signal receiving and transmitting units each covering a predetermined area and forming part of a wireless telephone network, each fixed wireless unit including means for transmitting wireless voice and control channel signals identifying said unit;

a movable signal processing unit, the unit including signal generating means for generating an emergency signal on detection of an emergency condition, the signal generating means including means for continuously scanning all voice and control channel signals from any fixed wireless signal receiving and transmitting units within range of the signal processing unit during an emergency condition and storing any received wireless unit identifying signals, and means for transmitting said emergency signal via said array of signal receiving and transmitting units, each emergency signal including received wireless unit identifying signals and identifying information for identifying the signal processing unit; and a monitoring means for receiving said emergency signals and computing an approximate location of said signal processing unit from said received wireless unit identifying signals.

2. The system as claimed in claim 1, wherein said signal processing unit comprises a portable phone for carrying by a person, the portable phone including a panic button for pressing by the person to generate said emergency signal, and includes communication means for selectively using said unit for standard two-way portable phone communications when no emergency situation exists.

3. The system as claimed in claim 1, wherein said signal processing unit comprises a mobile phone unit carried in a vehicle.

4. The system as claimed in claim 1, wherein each wireless unit has a unique identifying code and said unique code is transmitted in said control channel signal, whereby the approximate location can be computed from said unique identifying code.

5. The system as claimed in claim 1, wherein each wireless unit is assigned a control channel, and some wireless units in said system have the same control channel, and said central monitoring means includes processing means for determining wireless unit location from said control channel information, said processing means including means for determining whether any of the received control channel signals correspond to wireless units having unique control channels and ambiguity resolution means for determining the most likely location of the wireless units from which signals are received where none of the units have unique control channels.

6. The system as claimed in claim 5, wherein the ambiguity resolution means comprises data storage means for storing a list of nearest neighbor wireless units for each wireless unit in the system, means for scanning said list to generate a set of nearest neighbor units for each possible location for each received control channel signal corresponding to more than one possible wireless unit location, and means for determining the most probable set based on the distance of each unit in a set from the center of mass of that set.

7. The system as claimed in claim 1, wherein the signal processing unit includes means for transmitting, for each wireless unit from which control channel signals are received, a signal strength signal which is a function of the strength of the signal received from the respective wireless unit, the signal strength signals comprising part of said emergency signal, and said central monitoring means including means for computing said approximate location from said control channel signals and signal strengths.

8. The system as claimed in claim 1, wherein said processing unit includes a modem linked to said signal generating means for transmitting said emergency signal directly to a computer at said central monitoring station via a modem at said monitoring station.

9. The system as claimed in claim 1, wherein said processing unit comprises a portable phone for carrying by a user, the portable phone comprising an integrated wireless telephone and alarm unit in a single housing, said housing having a panic button for actuating by the user to initiate generation and transmission of said emergency signal, the portable phone unit comprising means for operating as a conventional wireless telephone for audio communications via said wireless array in a communication mode when no emergency signal generation has been initiated by a user, and means for operating as an alarm signal transmitting unit for transmitting alarm signals to said central monitoring station in an alarm mode on actuation of said panic button.

10. The system as claimed in claim 9, including a modem built into said portable phone unit and comprising means for transmitting said emergency signal in the form of data readable directly by a computer at said central monitoring station via a modem at said central monitoring station.

11. The system as claimed in claim 1, wherein each wireless unit is divided into a plurality of sectors and sector information is transmitted as part of the voice and control channel signal, and said processing unit includes means for transmitting received sectoring information as part of said emergency signal, said monitoring station including processing means for deriving an approximate location area of said processing unit based on said received sectoring information.

12. The system as claimed in claim 1, wherein said monitoring means comprises a remote central monitoring station for receiving input signals via said array.

13. The system as claimed in claim 1, wherein said monitoring means comprises a plurality of mobile telephone switching offices, each switching office being associated with a group of said wireless units and receiving signals transmitted via said group.

14. The system as claimed in claim 1, including a modified radio direction finder for homing in on said emergency signal, said emergency signal having a voice channel frequency and an SAT color code, said modified radio direction finder including means for homing in on said voice channel frequency for receiving any signals in the vicinity at said frequency, means for decoding the SAT color code from any received signal at the correct voice channel frequency, and means for displaying the decoded SAT color code.

15. The system as claimed in claim 1, wherein each wireless unit is assigned a control channel and a digital color code, some wireless units in the system having the same control channel, and said central monitoring means includes processing means for determining wireless unit location from said control channel information in a received emergency signal, means for determining whether a received control channel signal corresponds to more than one possible wireless unit location, and means for initiating an ambiguity resolution process if the control channel signal corresponds to more than one possible location, the ambiguity resolution process comprising means for determining the digital color code of the received control channel signal, means for determining if the digital color code for that control channel corresponds to a unique location, and means for determining the most likely location if the digital color code is not unique for the received control channel.

16. The system as claimed in claim 15, wherein the means for determining the most likely location when one received control channel and digital color code corresponds to at least two possible locations comprises means for generating a cluster of adjacent cell sites for each possible location, each cell site of each cluster corresponding to a respective control channel and digital color code, means for determining whether the received signal includes any additional control channels corresponding to other cell sites, means for determining whether the additional control channels received are in any of the generated clusters, and means for determining whether any of the additional control channels received has a unique color code, and means for using any channels with unique color codes to determine the most likely cluster location.

17. The system as claimed in claim 16, further comprising ambiguity resolving means for computing a most likely cluster location when none of the received control channels has a unique color code, the ambiguity resolving means comprising means for determining the most likely cluster of cell sites by determining the distance of each cell site in each cluster from a center of mass of the cluster, and determining the most likely location based on the closeness of the detected cell sites from the center of mass of each possible cluster.

18. A method of locating a wireless phone unit within a network of wireless units for receiving and transmitting wireless signals, comprising the steps of:

transmitting wireless control signals from each of said wireless units for reception by any wireless phone unit in the vicinity of said wireless unit, the control signal of each wireless unit including unit identifying information;

detecting an emergency input at said phone unit;

generating and transmitting an emergency signal from said phone unit at periodic intervals on detection of said emergency input, each emergency signal including phone unit identifying information and wireless unit identifying information received by said phone unit from any wireless units in the vicinity of said phone unit;

receiving said emergency signal at a signal processing station; and processing the information at said signal processing station to determine an approximate location of said wireless phone unit using said wireless unit identifying information.

19. The method as claimed in claim 18, wherein said step of generating an emergency signal includes the steps of extracting and storing signal strength data from the control signals received by the phone unit from adjacent wireless units, and transmitting said signal strength data as part of said emergency signal, and said processing step comprises computing of an approximate location from said signal strength data.

20. The method as claimed in claim 18, wherein each wireless unit transmits sector information as part of said control signal, and the step of generating and transmitting said emergency signal includes transmission of said sector information as part of said emergency signal, said processing step comprising computing of an approximate location based on received sector information from each adjacent wireless unit.

21. The method as claimed in claim 18, wherein the step of processing the information includes the steps of determining whether the received wireless unit identifying information from each wireless unit output signal received by said phone unit corresponds to a unique wireless unit location or more than one possible wireless unit location, using any wireless unit identifying information determined to correspond to only one possible wireless unit to compute the approximate location of said phone unit, and, in the event that none of the received unit identifying information signals correspond to a unique unit location, carrying out an ambiguity resolution process to determine which of the possible wireless unit locations is the most probable.

22. The method as claimed in claim 21, wherein the ambiguity resolution process comprises the steps of generating, for each received unit identifying information, a set of nearest neighbor units for each possible wireless unit location corresponding to said unit identifying information, and determining the most probable of the generated sets by determining the distance of each wireless unit in a set from the center of mass of that set and eliminating those sets having one or more wireless units which are more than a predetermined distance from the center of mass.

23. The method as claimed in claim 21, wherein the step of determining whether the received wireless unit identifying information corresponds to a unique wireless unit location comprises determining a control channel and digital color code for each received wireless unit output signal, and checking stored information on the control channel and digital color code for each unit in the system to determine whether the control channel corresponds to a unique location and, if not, whether the digital color code for that control channel corresponds to a unique location.

24. An integrated personal protection system, comprising:

a portable, wireless phone unit for carrying by a user, the unit including transceiver means for transmitting and receiving wireless communication signals via a wireless telephone network having an array of wireless signal receiving and transmitting sites, each wireless site transmitting control channel signals, an alarm input for activating by the user in the event of an emergency, and processor means for generating a first type of emergency signal for transmission by said transceiver means on activation of said alarm input, said emergency signal including phone unit identifying information and control channel signals received from adjacent wireless sites forming part of said telephone network, said portable phone unit operating to transmit said emergency signals in an emergency mode on activation of said alarm input and being operable when not in said emergency mode as a conventional portable phone in a communication mode;

a wireless phone unit for installation in a vehicle, the unit having sensor inputs for connection to sensors in said vehicle for detecting an emergency condition, transceiver means for transmitting and receiving wireless communication signals via said wireless telephone network, and processor means for monitoring said sensor inputs and generating a second type of emergency signal on detection of an emergency condition in said vehicle, said second emergency signal including vehicle identifying information and control channel signals received by said transceiver means from adjacent wireless sites, said wireless phone unit operating to transmit said emergency signal in an emergency mode on detection of said emergency condition and otherwise being operable in a communication mode for voice communications as a conventional wireless phone unit;

a building alarm unit for installation in a building, the unit having sensor inputs for linking to a plurality of sensors for detecting different types of emergencies in the building, transceiver means for transmitting and receiving wireless communication signals via said wireless telephone network, and processor means for monitoring said sensor inputs and generating a third type of emergency signal on detection of an emergency condition in said building, the third type of emergency condition including data on the location of the building and the type of alarm, said transceiver further comprising means for transmitting said emergency signal to a remote monitoring station;

said vehicle and building alarm units each having receptacle means for receiving said wireless phone unit as a dumb handset when the user is in the vehicle or building, the alarm mode of said wireless phone unit being disabled while it is inserted in either of said receptacle means, and reactivated on removal from said receptacle means;

a central monitoring station for receiving said emergency signals and computing an approximate phone unit location from said control channel signals if a first or second type of emergency signal is received.

25. A tracking system for tracking a cellular phone unit, comprising:

an array of cell sites each covering a predetermined area, each cell site having a transmitter for transmitting cellular control signals;

a cellular phone unit having a cellular transceiver for receiving cellular control signals from any adjacent cell site and for transmitting cellular phone signals via said adjacent cell site, said signals including data and an assigned digital color code at an assigned voice channel frequency for that call; and direction finder means for homing in on said cellular phone signals transmitted by said cellular phone unit to locate said unit, the direction finder means having an adjustable target frequency for setting at a selected voice channel frequency, receiver means for receiving any radio signals in the vicinity and determining whether the frequency of said signals correspond to the target frequency, means for extracting the digital color code from any received signal at the target frequency, and means for displaying the digital color code.

26. The system as claimed in claim 25, wherein said direction finder means comprises a modified radio direction finder having an outer housing with a front panel, adjustment means on the front panel for setting the target frequency, direction indicator means on the front panel for indicating the direction of any received signal at the target frequency, color code display means on the front panel for displaying the color code, signal processing means in the housing for processing any received radio signal and determining whether it is at the target frequency, said processing means being linked to said direction indicator means, and code extracting means linked to said signal processing means for extracting the digital color code from any received signal at said target frequency, said code extracting means being linked to said color code display means.

\* \* \* \* \*